US008117296B2

(12) United States Patent
Liu et al.

(10) Patent No.: US 8,117,296 B2
(45) Date of Patent: Feb. 14, 2012

(54) DOMAIN NAME RESOLUTION USING A DISTRIBUTED DNS NETWORK

(75) Inventors: Zaide "Edward" Liu, Cupertino, CA (US); Eric Sven-Johan Swildens, Mountain View, CA (US); Richard David Day, Upton, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 12/786,895

(22) Filed: May 25, 2010

(65) Prior Publication Data

US 2010/0257258 A1  Oct. 7, 2010

Related U.S. Application Data

(63) Continuation of application No. 11/264,616, filed on Oct. 31, 2005, now Pat. No. 7,725,602, which is a continuation-in-part of application No. 10/931,774, filed on Aug. 31, 2004, now Pat. No. 7,155,723, which is a continuation of application No. 09/909,711, filed on Jul. 19, 2001, now Pat. No. 7,523,181.

(60) Provisional application No. 60/219,172, filed on Jul. 19, 2000, provisional application No. 60/219,166, filed on Jul. 19, 2000, provisional application No. 60/219,946, filed on Jul. 19, 2000, provisional application No. 60/219,177, filed on Jul. 19, 2000.

(51) Int. Cl.
*G06F 15/173* (2006.01)
(52) U.S. Cl. ......... 709/223; 709/235; 709/245; 713/150
(58) Field of Classification Search .................. 709/220, 709/223, 235, 245; 713/150, 168
See application file for complete search history.

(56) References Cited

U.S. PATENT DOCUMENTS

| 5,729,689 A | 3/1998 | Allard et al. |
| 5,774,660 A | 6/1998 | Brendel et al. |

(Continued)

FOREIGN PATENT DOCUMENTS

EP  817020 A2  1/1998

(Continued)

OTHER PUBLICATIONS

Schemers, R., "Ibnamed: A Load Balancing Name Server in Perl," Proceedings of the Systems Administration Conference, Sep. 17, 1995 pp. 1-11, XP002054865, p. 2, left-hand column, paragraph 3, p. 3, left-hand column, paragraph 1.

(Continued)

*Primary Examiner* — Frantz Jean
(74) *Attorney, Agent, or Firm* — Joshua T. Matt

(57) ABSTRACT

A distributed DNS network includes a central origin server that actually controls the zone, and edge DNS cache servers configured to cache the DNS content of the origin server. The edge DNS cache servers are published as the authoritative servers for customer domains instead of the origin server. When a request for a DNS record results in a cache miss, the edge DNS cache servers get the information from the origin server and cache it for use in response to future requests. Multiple edge DNS cache servers can be deployed at multiple locations. Since an unlimited number of edge DNS cache servers can be deployed, the system is highly scalable. The disclosed techniques protect against DoS attacks, as DNS requests are not made to the origin server directly.

27 Claims, 19 Drawing Sheets

U.S. PATENT DOCUMENTS

| | | | |
|---|---|---|---|
| 5,918,228 | A | 6/1999 | Rich et al. |
| 6,029,196 | A | 2/2000 | Lenz |
| 6,052,718 | A | 4/2000 | Gifford |
| 6,070,191 | A | 5/2000 | Narendran et al. |
| 6,078,943 | A | 6/2000 | Yu |
| 6,092,178 | A | 7/2000 | Jindal et al. |
| 6,112,239 | A | 8/2000 | Kenner et al. |
| 6,118,765 | A | 9/2000 | Phillips |
| 6,119,171 | A | 9/2000 | Alkhatib |
| 6,128,279 | A | 10/2000 | O'Neil et al. |
| 6,167,438 | A | 12/2000 | Yates et al. |
| 6,173,311 | B1 | 1/2001 | Hassett et al. |
| 6,182,148 | B1 | 1/2001 | Tout |
| 6,185,601 | B1 | 2/2001 | Wolff |
| 6,249,801 | B1 | 6/2001 | Zisapel et al. |
| 6,292,832 | B1 | 9/2001 | Shah et al. |
| 6,298,381 | B1 | 10/2001 | Shah et al. |
| 6,304,967 | B1 * | 10/2001 | Braddy .................. 713/150 |
| 6,330,605 | B1 | 12/2001 | Christensen et al. |
| 6,381,627 | B1 | 4/2002 | Kwan et al. |
| 6,405,252 | B1 | 6/2002 | Gupta et al. |
| 6,415,323 | B1 | 7/2002 | McCanne et al. |
| 6,415,335 | B1 | 7/2002 | Lowery et al. |
| 6,430,619 | B1 | 8/2002 | Sitaraman et al. |
| 6,449,647 | B1 | 9/2002 | Colby et al. |
| 6,546,014 | B1 | 4/2003 | Kramer et al. |
| 6,560,717 | B1 | 5/2003 | Scott et al. |
| 6,650,621 | B1 | 11/2003 | Maki-Kullas |
| 6,654,804 | B1 | 11/2003 | Fleming |
| 6,665,271 | B1 | 12/2003 | Thomas et al. |
| 6,735,631 | B1 | 5/2004 | Oehrke et al. |
| 6,760,745 | B1 | 7/2004 | Tan et al. |
| 6,792,575 | B1 | 9/2004 | Samaniego et al. |
| 6,795,860 | B1 | 9/2004 | Shah |
| 6,829,654 | B1 | 12/2004 | Jungck |
| 7,058,706 | B1 | 6/2006 | Iyer et al. |
| 7,082,463 | B1 | 7/2006 | Bradley et al. |
| 7,114,008 | B2 | 9/2006 | Jungck et al. |
| 7,424,737 | B2 | 9/2008 | Wesinger et al. |
| 7,725,602 | B2 | 5/2010 | Liu et al. |
| 2001/0049741 | A1 | 12/2001 | Skene et al. |
| 2001/0052016 | A1 * | 12/2001 | Skene et al. .................. 709/226 |
| 2002/0026511 | A1 | 2/2002 | Garcia-Luna-Aceves et al. |
| 2002/0052942 | A1 | 5/2002 | Swildens et al. |
| 2002/0073199 | A1 | 6/2002 | Levine et al. |
| 2002/0099816 | A1 | 7/2002 | Quarterman et al. |
| 2002/0103846 | A1 | 8/2002 | Zisapel et al. |
| 2002/0129134 | A1 | 9/2002 | Leighton et al. |
| 2004/0133793 | A1 | 7/2004 | Ginter et al. |
| 2005/0033858 | A1 | 2/2005 | Swildens et al. |
| 2005/0097445 | A1 | 5/2005 | Day et al. |
| 2008/0147866 | A1 | 6/2008 | Stolorz et al. |
| 2010/0005175 | A1 | 1/2010 | Swildens et al. |

FOREIGN PATENT DOCUMENTS

| | | |
|---|---|---|
| EP | 959601 A1 | 11/1999 |
| WO | WO 99 29083 A1 | 6/1999 |
| WO | WO 00/22526 A1 | 4/2000 |

OTHER PUBLICATIONS

Zhou, T., "Web Server Load Balancers" Apr. 2000, Windows & .NET Magazine.

Grimm, C. et al., "Load and Traffic Balancing in Large Scale Cache Meshes," 1998, Computer Networks and ISDN Systems, XP004138701, pp. 1687-1695.

Paul, S. et al., "Distributed Caching with Centralized Control," 2001; Computer Communications, pp. 256-268.

Rugelj, J. et al., "Advanced Mechanism for the Efficient Employment of Distributed Hypermedia Applications in Education," 1996, XP-002194090, 4 pages.

Wu, K-L. et al., "SpeedTracer: A Web Usage Mining and Analysis Tool," 1998, IBM Systems Journal, vol. 37, No. 1, pp. 89-105.

Cooper, I. et al., "Intranet Web Replication and Caching Taxonomy, draft-ietf-wrec-taxonomy-05.txt," Jul. 4, 2000, Intranet-Draft, XP-002194089, 31 pages.

Rekhter, Y., Oct. 1991, IBM Corporation, www.faqs.org/rfcs/rfc1265.html, pp. 1-7.

Bhattachjarjee, S. et al., "Application-Layer Anycasting," Proceedings of the IEEE Infocom '97, Apr. 7-12, 1997, vol. 3, Apr. 7, 1997.

Moore, et al., "Sonar-a Network Proximity Service," IETF Internet Draft, Feb. 23, 1996, p. 1, paragraphs 2-4; p. 5, paragraphs 1-2; p. 6, paragraph 4; p. 7, paragraph 2.

Guyton, et al., "Locating Nearby Replicated Internet Services," Computer Communications Review, Association for Computing Machinery, New York, US, vol. 25, No. 4, Oct. 1, 1995, pp. 288-298.

Fei, et al., "A Novel Server Selection Technique for Improving the Response Time of a Replicated Service," Proceedings of the IEEE Infocom '98 Conference, San Francisco, CA, vol. 2, Mar. 29, 1998, pp. 793-791.

* cited by examiner

Cache Control Page

Domains Page

By Location – World Map

By Location – Traffic

Overall Time: East-US Locations

| | | | | | | | | | | |
|---|---|---|---|---|---|---|---|---|---|---|
| server-14/dc/cw | | | | | | | | | | |
| server-14/dc/abovn | | | | | | | | | | |
| server-14/newark/qwest | | | | | | | | | | |
| server-4/sterling/exodus | 0 | 131 | 263 | 395 | 526 | 658 | 790 | 921 | 1053 | 1185 | 1317 |

Overall Time Table

FIG. 5G

Location: server-14,dc,cw(204.71.35.146)

| URL | | | | | | | | | | |
|---|---|---|---|---|---|---|---|---|---|---|
| www.speedera.com/ | | | | | | | | | | |
| www.spee...ockground.gif | | | | | | | | | | |
| www.spee...s/barbend.gif | | | | | | | | | | |
| www.spee...mpany_off.gif | | | | | | | | | | |
| www.spee...ology_off.gif | | | | | | | | | | |
| www.spee...tners_off.gif | | | | | | | | | | |
| www.spee.../news_off.gif | | | | | | | | | | |
| www.spee.../jobs_off.gif | | | | | | | | | | |
| www.spee...pport_off.gif | | | | | | | | | | |
| www.spee...l_circles.gif | | | | | | | | | | |
| www.spee...dera_logo.gif | | | | | | | | | | |
| www.spee...ges/globe.gif | | | | | | | | | | |
| www.spee.../speedera.gif | 0 | 51 | 102 | 153 | 204 | 255 | 306 | 357 | 408 | 459 | 511 |

| URL | | | | | | | | | | |
|---|---|---|---|---|---|---|---|---|---|---|
| IP Address | ERR | HRC | LEN | CHK | STT | DRT | COT | DST | FNT | END |
| www.speedera.com/ | | | | | | | | | | |
| 209.24.35.130 | 0 | 200 | 7586 | 632552 | 0 | 0 | 214 | 130 | 136 | 482 |
| www.speedera.net/www.speedera.com/images/background.gif | | | | | | | | | | |
| 204.71.35.135 | 0 | 200 | 87 | 8934 | 482 | 12 | 0 | 1 | 0 | 496 |
| www.speedera.net/www.speedera.com/images/barbend.gif | | | | | | | | | | |
| 204.71.35.134 | 0 | 200 | 3009 | 357219 | 494 | 1 | 1 | 1 | 0 | 498 |

Location Table

FIG. 5H

Domains Page

Traffic Management Recent Activity graph

Overall Time Table

| Location:server-14,dc,cw(204.71.35.146) | | | | | | | | | |
|---|---|---|---|---|---|---|---|---|---|
| URL | | | | | | | | | |
| IP Address | ERR | HRC | LEN | CHK | STT | DRT | COT | DST | FNT | END |
| www.speedera.com/ | | | | | | | | | | |
| 209.24.35.130 | 0 | 200 | 7586 | 632552 | 0 | 0 | 214 | 130 | 136 | 482 |
| www.speedera.net/www.speedera.com/images/background.gif | | | | | | | | | | |
| 204.71.35.135 | 0 | 200 | 87 | 8934 | 482 | 12 | 0 | 1 | 0 | 496 |
| www.speedera.net/www.speedera.com/images/barbend.gif | | | | | | | | | | |
| 204.71.35.134 | 0 | 200 | 3009 | 357219 | 494 | 1 | 1 | 1 | 0 | 498 |

Location Table

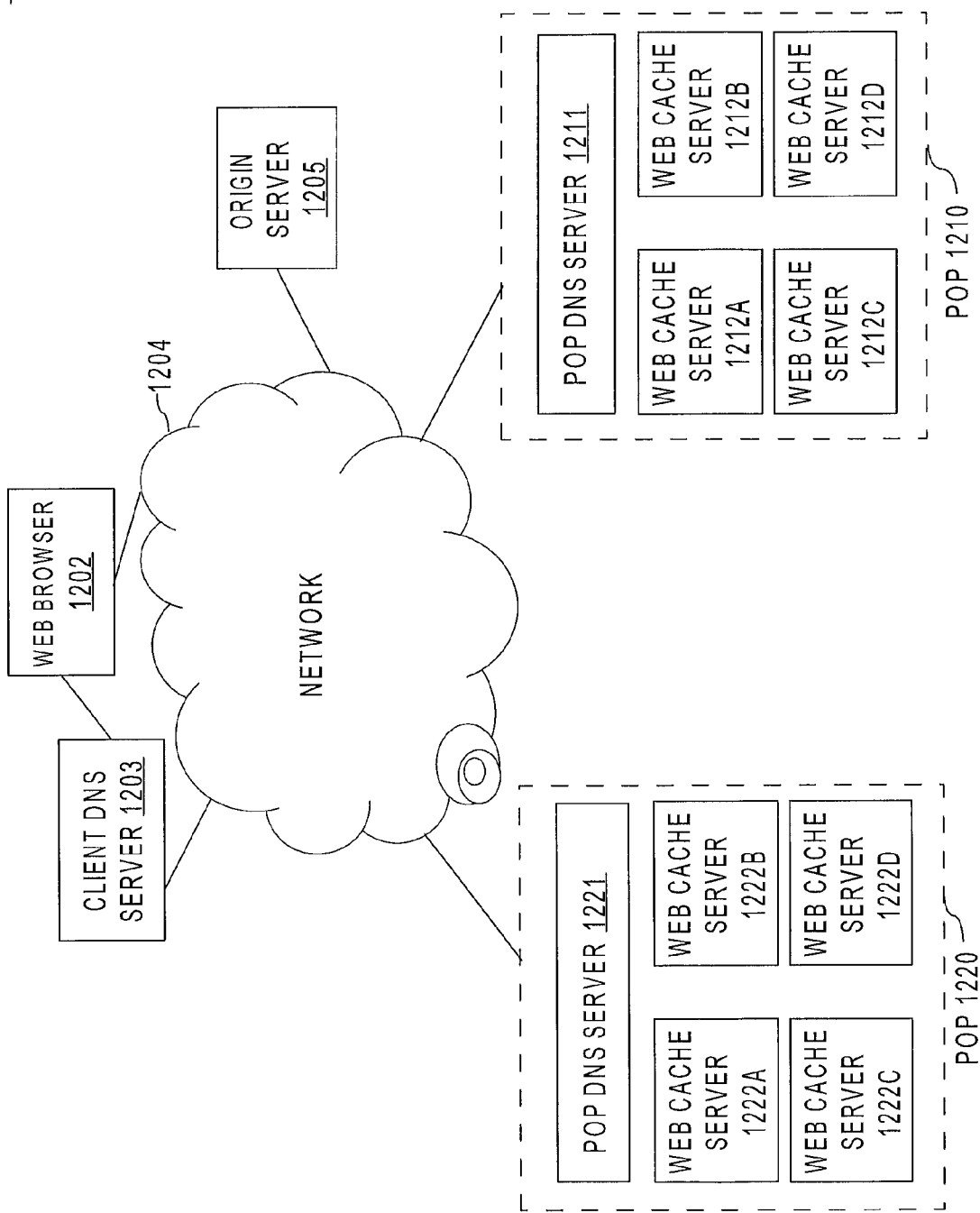

DOMAIN NAME RESOLUTION USING A DISTRIBUTED DNS NETWORK

CROSS-REFERENCES TO RELATED APPLICATIONS

The present application is a continuation of U.S. patent application Ser. No. 11/264,616 filed Oct. 31, 2005 now U.S. Pat. No. 7,725,602, which is a continuation-in-part of Ser. No. 10/931,774, Issued U.S. Pat. No. 7,155,723 B1 filed Aug. 31, 2004, which is a continuation of Ser. No. 09/909,711 Issued U.S. Pat. No. 7,523,181 B2 filed Jul. 19, 2001, and claims priority to Provisional U.S. Patent Application Nos. 60/219, 172, 60/219,166, 60/219,946, and 60/219,177 all filed on Jul. 19, 2000, and Issued U.S. Pat. No. 6,405,252 B1 filed Aug. 23, 2000, all of which are incorporated by reference as if fully set forth herein.

FIELD OF THE INVENTION

The invention relates to world wide area networking in a computer environment. More particularly, the invention relates to domain name resolution in the world wide web.

BACKGROUND

The Internet is a world wide "super-network" which connects together millions of individual computer networks and computers. The Internet is generally not a single entity. It is an extremely diffuse and complex system over where no single entity has complete authority or control. Although the Internet is widely know for one of its ways of presenting information through the World Wide Web (herein "Web"), there are many other services currently available based upon the general Internet protocols and infrastructure.

Information on the Web often is presented on "pages" of graphics and text that contain "links" to other pages either within the same set of data files (i.e., Web site) or within data files located on other computer networks. Users often access information on the Web using a "browser" program such as one made by Netscape Communications Corporation (now America Online, Inc.) of Mountain View, Calif. or Explorer™ from Microsoft Corporation of Redmond, Wash. Browser programs can process information from Web sites and display the information using graphics, text, sound, and animation.

A domain name is a meaningful and easy-to-remember "handle" for an Internet address. The domain name system (DNS) is a name resolution protocol through which Internet domain names are located and translated into Internet Protocol addresses. DNS converts host names to IP addresses and vice-versa. Each domain is managed by a DNS name server, which is a server that contains the host name information about the hosts and sub-domains within its domain.

The DNS database is partitioned into sets of related records that are replicated on multiple servers; each such set of records is called a zone. DNS name servers transfer zones from each other to maintain the consistency of information in the DNS.

As use of the Internet has grown, so too have the number of DNS servers. Traffic management at the DNS servers has become more important. In addition, because all world wide web requests go through the DNS, opportunities for hacking and other malicious behaviors exist.

From the above, it is seen that an improved DNS server that manages DNS traffic and detects potential attacks is highly desirable.

BRIEF DESCRIPTION OF THE DRAWINGS

FIGS. 5A to 5H are simplified diagrams of content delivery network according to an embodiment;

FIG. 12 is a block diagram illustrating a Content Delivery Network, including cache servers and origin servers, in which an embodiment of the invention may be implemented.

DETAILED DESCRIPTION

In a content delivery network (CDN), web cache servers are used to serve content to clients. To reduce network traffic, the entire Internet address space is broken up into multiple zones, and each zone is assigned to a group of caching servers. If a caching server gets a request from a client that is not in the zone assigned to that caching server, it forwards the request to the caching server assigned to that zone.

As disclosed in detail herein, a distributed DNS network is used in a CDN to provide DNS functionality. Edge DNS cache servers are deployed at multiple locations and published as authoritative servers for domains. The edge DNS cache servers are configured to cache the DNS records of the origin DNS server that actually controls the zone. Since any number of edge DNS cache servers are allowed at any number of locations, the distributed DNS network provides unlimited scalability, fast domain name resolution, and is effective against hacker attacks, in particular Denial of Service (DoS) attacks.

Other aspects and advantages of the invention will become apparent from the following detailed description in combination with the accompanying drawings, illustrating, by way of example, the principles of the invention.

Functional Overview of Load-Balancing Service in a CDN

A load-balancing service that allows DNS servers to select content servers for serving content requests from clients is described in co-pending application U.S. patent application Ser. No. 10/931,774 filed Aug. 31, 2004, entitled LOAD-BALANCING SERVICE, hereinafter referred to as the "LOAD-BALANCING SERVICE application", which has been incorporated by reference. The distributed DNS network of the present invention is described herein in the context of a system that provides a load-balancing service for directing client requests for hosted customer content to an appropriate web caching content server in a CDN, however it will be apparent to those skilled in the art that the techniques disclosed herein can be used in many other types of networks and systems.

A method and system for providing DNS servers with useful information to effectively perform load balancing is described in the co-pending LOAD BALANCING SERVICE application. The method can be applied to a world wide network of computers, such as the Internet or an internet.

A user interface device and system for providing a shared GTM and CDN (collectively Universal Distribution Network) for a service fee, where the customer or user does not need to purchase significant hardware and/or software features, is also described. The interface device and system allows a customer to scale up its Web site, without a need for expensive and difficult to use hardware and/or software. In an embodiment, the customer merely pays a service fee.

Figure 1:
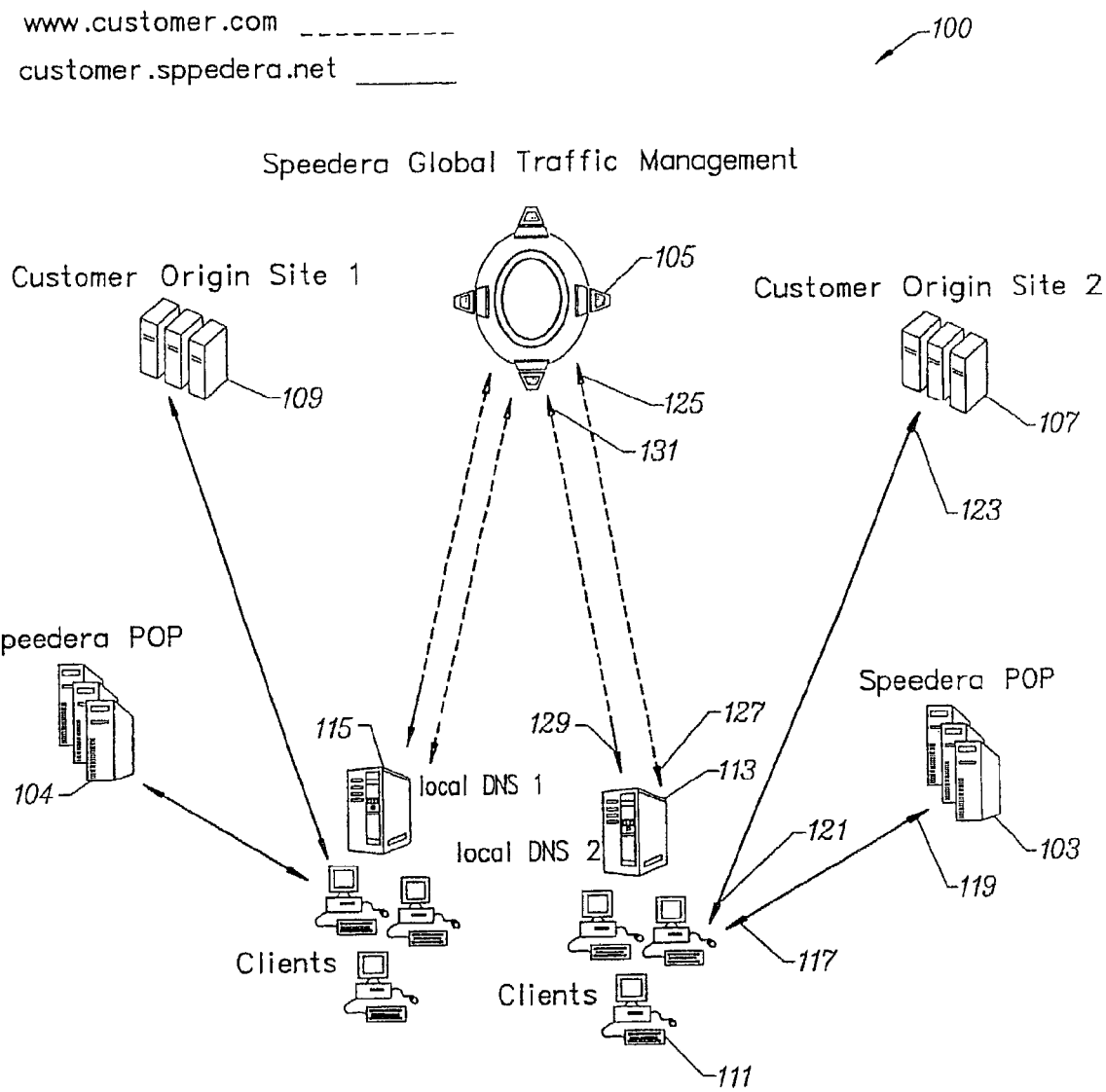
FIG. 1 is a simplified diagram of a system according to an embodiment.

An overall system diagram 100 is illustrated in FIG. 1. The diagram is merely an example, which should not unduly limit the scope of the claims herein. As shown, the system 100 includes a variety of features to define the Universal Delivery Network (UDN). The UDN has a combined content delivery network 103 and 104 and a global traffic management network (GTM) 105, which are coupled to each other. This eliminates the need for independent CDN and GTM solutions. The UDN can be implemented as a single outsourced solution or service to a customer. When deployed across the WAN, it creates a unified network that provides a universal solution for content routing and high availability delivery.

Customers can leverage the size, scope, and location of the UDN to store content such as HTML, images, video, sound and software for fast and highly available access by clients. The network can also incorporate customer origin sites 107, 109 that will then benefit from shared load balancing and traffic management. Customers with generated content, such as search engines, auctions and shopping carts, can use the latter feature to add their own content servers to the network. The system typically requires no software or hardware to be installed or run at a customer site. A Web interface is available for display of the network's current status as well as historical statistics on a per customer basis.

The system functions by mapping hostnames, such as "www<dot>customer<dot>com" to a customer's origin servers 107 and 109. The local DNS 113 queries the traffic management system 105 for name resolution of the customer's Web site and receives a response specifying the server best suited to handle the request, either customer origin servers 107 or cache servers 103 located in the UDN. When the client 111 requests a customer homepage, tags within the HTML direct the imbedded static content to the network of cache servers 103 and 104. In this example the static content may be tagged with a domain name like customer<dot>customer<dot>com. Each local DNS in the example is directed to a different resource for each hostname based on several factors, such as proximity to the resource, network congestion, and server load.

In this example, "www<dot>customer<dot>com" is mapped to the customer origin servers represented by customer origin sites 109, 107. "Customer<dot>speedera<dot>net" is mapped to a collection of delivery nodes represented by point of presence servers, i.e., POPs 103, 104. An example of a method for using such a UDN follows.

1. The client 111 requests a customer home page: www<dot>customer<dot>com from a local DNS 113.
2. The local DNS 113 queries the traffic management system 105 for name and address resolution and receives a reply 125, 127 indicating the optimal customer origin site to retrieve the homepage 131. In this step, the traffic management system still looks at many if not all factors; network health, server health, packet loss, cost, etc. to determine the optimal customer origin site.
3. The client connects to the site and retrieves the home page (lines 123, 121).
4. An object with the image tag specifying http://customer<dot>speedera<dot>net/www<dot>customer<dot>com/hello.gif is found in the HTML of the homepage.
5. The local DNS queries the traffic management system for name and address resolution.
6. The traffic management system looks 129, 131 at factors such as network performance and server load and returns the address of the POP best suited to serve the requested content.
7. The client then retrieves (117, 119) the content from the specified delivery node.

This sequence of steps is merely illustrative. The steps can be performed using computer software or hardware or a combination of hardware and software. Any of the above steps can also be separated or be combined, and can also be changed in order. One of ordinary skill in the art would recognize many other variations, modifications, and alternatives. Details of each of the features noted above are more fully described below.

The DNS server (DNS) can be thought of as the traffic director of the system. It contains a mapping of where resources (grouped by hostnames) have been allocated as well as the current state of each resource and their availability to each client. It receives the static information (the mappings) from the configuration file and the dynamic information (resource availability) from the probes. The configuration file also instructs the DNS server how to weight the various criteria available when making its decisions. The DNS is a fully functional DNS server and is compatible with current versions of BIND. Decision criteria cover such areas as resource availability, resource load, latency, static mapping configuration, persistence requirements, fail over logic, weighting parameters, and others, each of which can be alone or combined.

Multiple DNS servers can be deployed to provide high availability and to avoid single points of failure. DNS is designed with the ability to proxy requests. This proxy ability combined with algorithms to divide client latency and persistence information across a group of DNS servers greatly reduces the problems associated with WAN replication and synchronization. In the event a request arrives at a DNS server that is not authoritative for a client, the DNS can proxy the request to any number of servers to find an authoritative answer.

The DNS server logs both request and operational data to the database for subsequent viewing. Both real-time and historical views are available. The request data allows the administrator and customer to see to the number of requests directed to each POP on a per hostname basis. The operational data provides statistics about the DNS server and is typically viewed only by the administrator.

One or more probes can be used to detect information about certain criteria from the network. There are probes including NetProbes, ServiceProbes and LatencyProbes. ServiceProbes test local server resources while LatencyProbes conduct network round trip tests to clients. Each POP in the network is assigned a ServiceProbe and a LatencyProbe—these can be separate machines but in most cases, the same machine will perform both types of probes.

Figure 2:
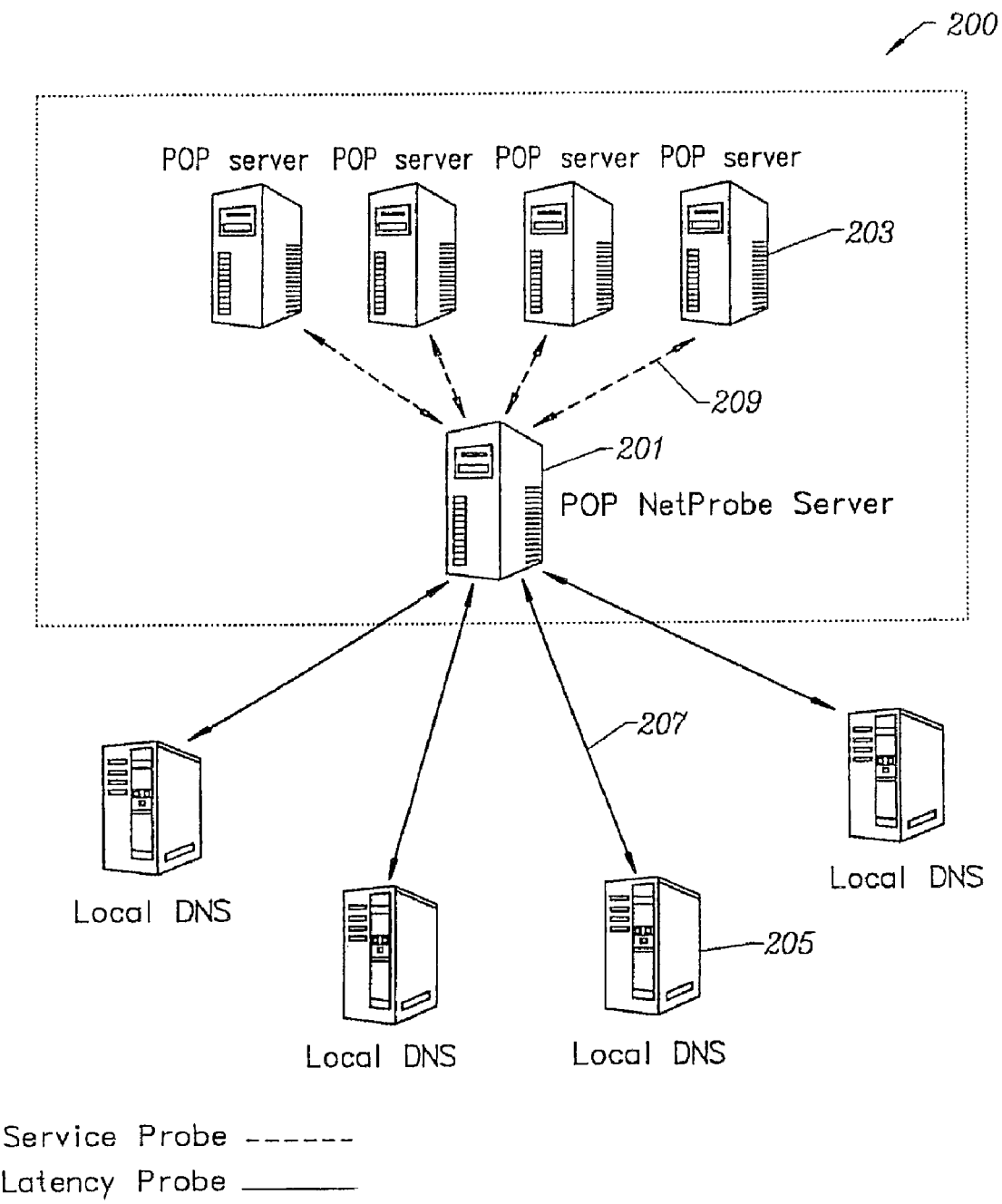
FIG. 2 is a more detailed diagram of probes used in the system according to an embodiment.

The NetProbes are responsible for providing the traffic management system with service and latency metrics. The metrics are reported to the DNS server and LogServers. FIG. 2 is an example simplified diagram 200 of these probes. One of ordinary skill in the art would recognize many variations, alternatives, and modifications. The diagram 200 includes a POP 201, which includes a NetProbes server. Service probes monitor the POP servers to test the availability and load of the services they support. The latency probe tests the round trip time between the POP and the DNS servers.

A ServiceProbe determines service metric information for servers in the UDN and reports them to the DNS server. Service metrics are one of the decision criteria used by the DNS to make its routing determinations. Each server in the UDN supports one or more services—e.g., a Web server provides HTTP service, a FTP server provides FTP service. The service probe uses various approaches for gathering data—such as a service test or statistical monitoring. The value of a service metric is dependent on the metric type and its implementation.

The HTTP service is an example of the service test approach. Rather than try to test the individual characteristics of a server that may have an impact on performance, the service itself is evaluated as a user would experience it, in order to determine its response time and validity. LOADP, a process running on each server, is implemented as a statistical monitor and is used as a generic service for testing purposes. LOADP provides direct measurement of many system parameters including CPU load, memory usage, swap and disk status, and is used in load balancing decisions.

Hostnames in the system are mapped to service types. This allows a given server to support multiple services and be evaluated independently for each of them. When a request for a particular hostname arrives at a DNS, the service associated with that hostname is compared on each of the machines to find the best-suited server. The data from the probes are sent to both the DNS as well as the database. By sending the data to the database, it allows the performance of the network to be viewed in real time as well as over a period of time.

Every server in the UDN is housed in a POP and each POP has a Latency Probe assigned to it. The Latency Probes determine the latency from their location to other locations on the Internet (specifically to client DNS' requesting name resolution). The DNS' use this information in determining the best server for a particular request. The list of locations that are used to determine the latency is driven by the DNS. When it is determined by a DNS server that its current information regarding latency between a POP and a client's local DNS has become stale, it will instruct the probe for that particular POP to recalculate the latency.

The probes utilize a collection of methods to determine the latency based on cost. The probe uses the least expensive method first and moves on to more expensive methods if no results are determined. The probe is designed so new methods can be plugged in as they are developed. The methods can be either active or passive and are prioritized based on accuracy. Active methods may take the form of ping or traceroute but are typically more sophisticated. Passive methods could reference local BGP tables to determine cost metrics.

The individual latency data is sent to the DNS servers while operational data of each method, their success rates, etc are sent to the database. LatencyProbes perform latency tests to the local client DNS (LDNS). The LatencyProbes build a table of LDNS' to test over time, receiving the list of which DNS client IP addresses to probe from the DNS Servers in the network.

Figure 3:
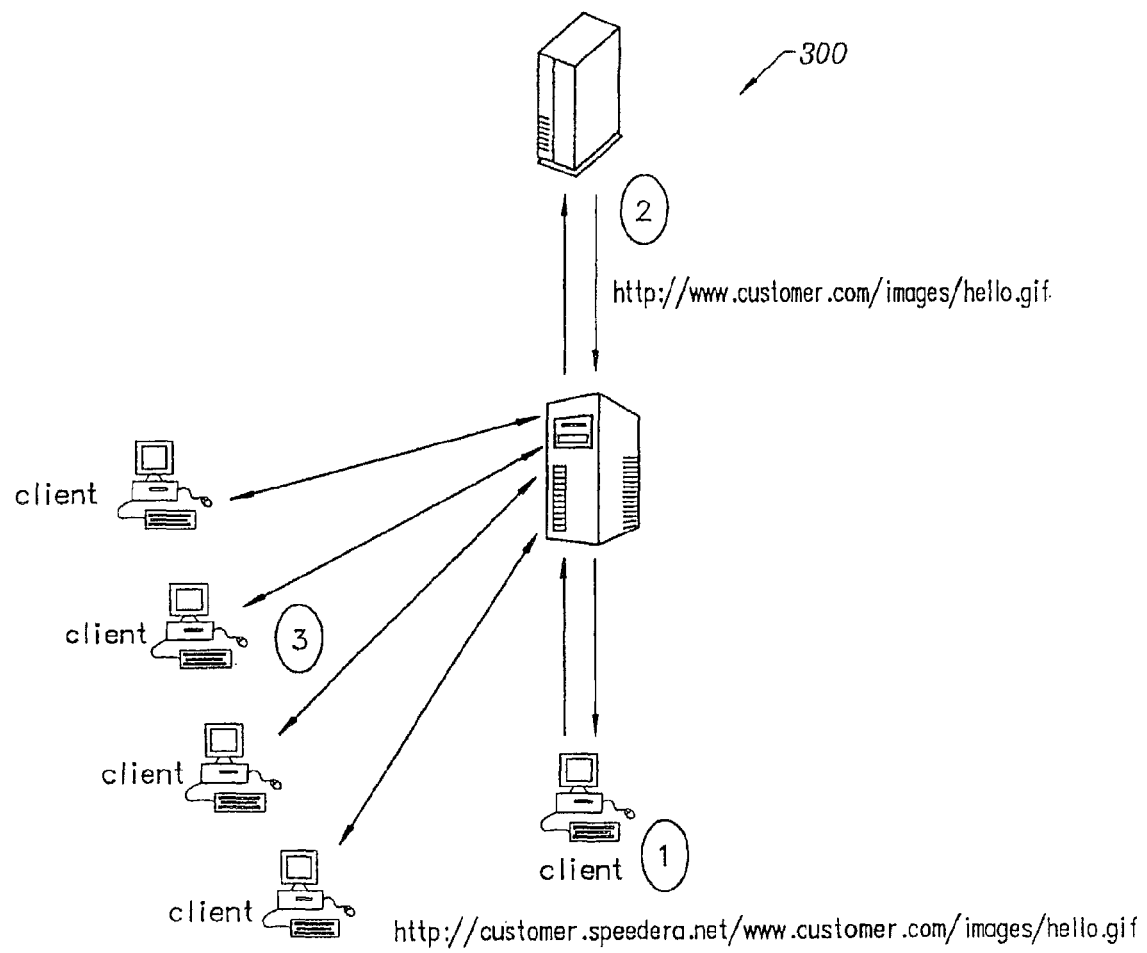
FIG. 3 is a more detailed diagram of a caching sequence used in the system according to an embodiment.

In a specific embodiment, the delivery nodes are the edge delivery servers of the network. Any type of IP based delivery servers can be supported, including but not limited to HTTP, SSL, FTP, Streaming, NNTP, and DNS servers. HTTP and SSL cache servers can be used. The HTTP and SSL servers are identical with the exception of the encryption used on the data to and from the SSL cache. These servers have a proxy component that allows them to fill their cache by making requests to an origin site if a requested object is not in the cache. A method according to the invention can be briefly described as follows in reference to the simplified diagram 300 of FIG. 3:

1. An initial user makes a request to the cache for an object http://customer<dot>speedera<dot>net/www<dot>customer<dot>com/images/test.gif (Step 1);
2. The cache, discovering that it does not have the object, will find the name of the origin site in the URL (www<dot>customer<dot>com) and make a request to the origin site for /images/test.gif (Step 2);
3. When the cache receives the object it is saved on disk and memory and returned to the initial user. Subsequent users who make requests for the same object will be satisfied by the cache directly (Step 3).

This sequence of steps is merely illustrative, and alternative methods can be used. Other protocols will work in a similar fashion unless there is a time concern with loading the first request. An example of this is a live streaming event or large file downloads (patches or video on demand). In these cases the caches may be pre-filled with the data that they need to serve. This pre-filling may take place over terrestrial lines or via satellite. Statistics about data delivered from the delivery nodes are reported through the logging system to the database for subsequent viewing and analysis.

The system also has a user interface. Here, engineering staff as well as customers can login to monitor and administer the network access from any Internet connected Web browser (with proper authentication). The user interface includes tables and graphs from the database. Data arrives at the user interface through the Logging System. This system has two parts: Log Distributor daemons and Log Collector daemons. The Log Distributor daemon monitors a defined directory for completed log files. Log files are defined as complete when they reach a defined size or age. A logging API shared by all resources controls the definitions of size and age. When the Log Distributor finds completed log files sends them back to one of many Log Collector daemons for insertion in the database.

As noted, the present network has many advantages. The network has as comprehensive, extensible, multi-faceted global traffic management system as its core, which is coupled to a content delivery network.

Figure 4:
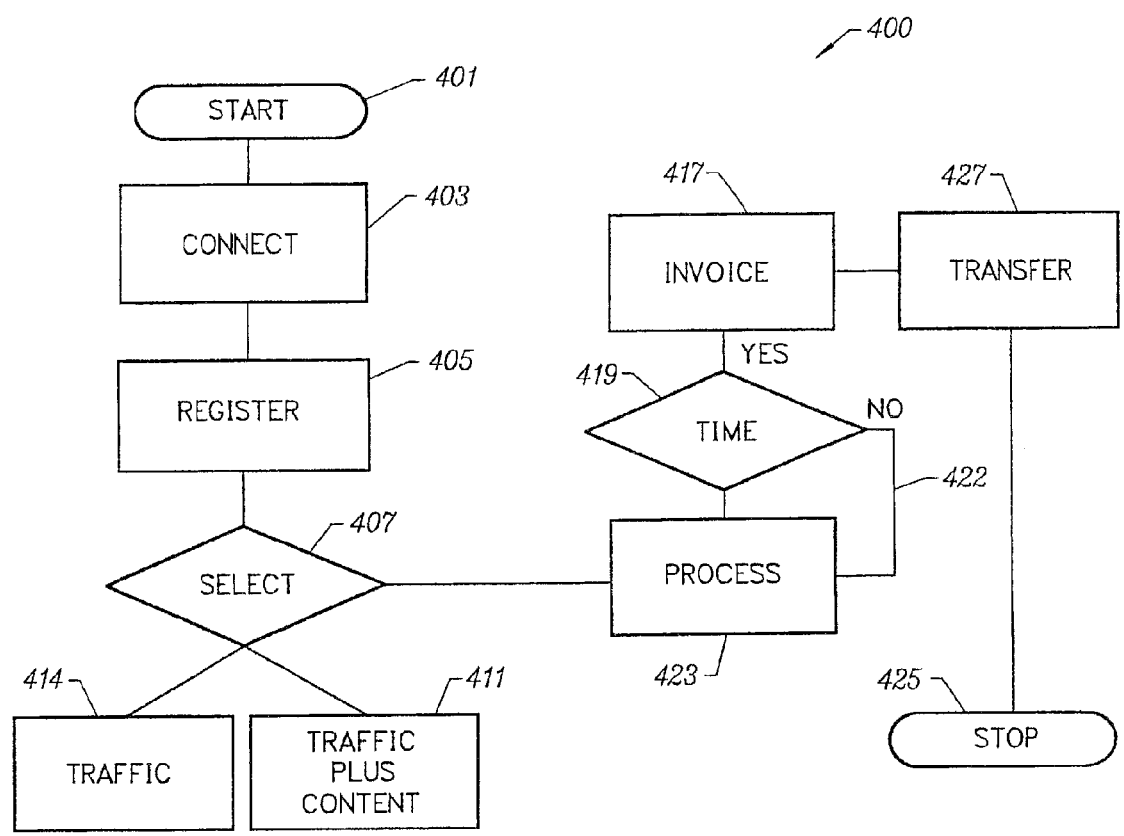
FIG. 4 is a simplified flow diagrams of methods according to embodiments of the present invention.

FIG. 4 is a simplified flow diagram of a service method 400. The diagram is merely an example, and one of ordinary skill in the art would recognize many variations. As shown, the method begins at start step 401. The method connects (step 403) a client to a server location through a world wide network of computers, such as an internet, the Internet, and others. The connection occurs via a common protocol such as TCP/IP. The client location is coupled to a server, which is for a specific user. The user can be any Web site that distributes content over the network. As merely examples, the user can be a portal such as Yahoo! Inc., an electronic commerce site such as Amazon.com, information sites including the educational sites, financial sites, adult entertainment sites, service sites, business to business commerce sites, etc. There are many other types of users that may use the system to distribute content in an efficient manner.

In a specific embodiment, the user registers its site on the server, which is coupled to a content distribution server coupled to a global traffic management server. The user registers to select (step 407) a service from the server. The service can be either a traffic management service (step 414) or a traffic management service and content distribution service (step 411). Depending upon the embodiment, the user can select either one and does not need to purchase the capital equipment required for either service. Here, the user merely registers for the service and pays a service fee. Once the service has been requested, the user performs some of the steps noted herein to use the service.

Next, the method processes (step 423) the user's request and allows the user to use the content distribution network and/or global traffic management network, where the user's Web pages are archived and distributed through the CDN in the manner indicated herein. The user's Web site should become more efficient from the use of such networks. Once a periodic time frequency or other frequency has lapsed (step 419), the method goes to an invoicing step, step 417. The invoicing step sends (step 427) an invoice to the user. Alternatively, the process continues until the periodic time frequency for the designated service lapses via line 422. The method stops, step 425.

This sequence of steps is merely illustrative, and one of ordinary skill in the art would recognize many variations. It is also understood that the examples and embodiments described herein are for illustrative purposes only and that various modifications or changes in light thereof will be suggested to persons skilled in the art.

Figure 4A:
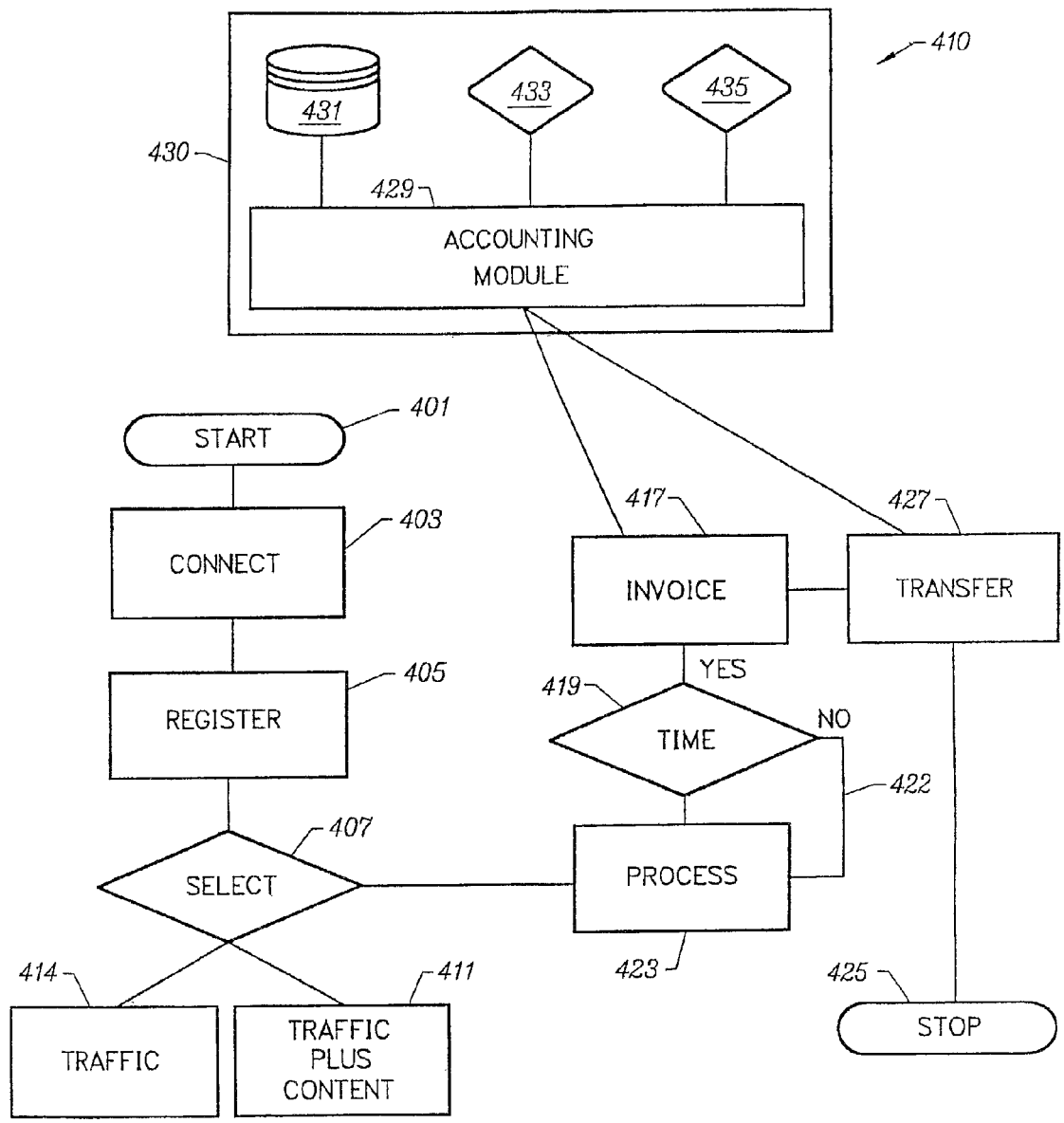
FIG. 4A is a simplified system diagram according to an embodiment.

FIG. 4A is a simplified diagram of an example computing system 430. Like reference numerals are used in this Fig., as the previous Fig. for cross-referencing purposes only. As shown, the computing system 430 carries out certain functionality that is integrated into the method above as well as others. The computing system includes an accounting module 429, which carries out certain accounting functions. The accounting module interfaces with mass memory storage 431, a microprocessing device 433, and a network interface device 435, which couples to local and/or wide area networks. The module oversees an invoicing step 417 and transfer step 427, as shown. Here, the accounting module is a task master for the service based method for using the content delivery network and/or global traffic management network.

Before discussing the accounting module in detail, we begin an overall method at start step 401. As before, the method connects (step 403) a client to a server location through a network of computers via a common protocol such as TCP/IP. The client location is coupled to a server, which is for a specific user. The user can be any Web site or the like that distributes content over the network.

The user registers its site on the server, which is coupled to a content distribution server coupled to a global traffic management server. The user registers to select (step 407) a service from the server. The service can be either a traffic management service (step 414) or a traffic management service and content distribution service (step 411).

Additionally, the user enters information such as the user's domain name, physical address, contact name, billing and invoicing instructions, and the like. Once the service has been requested, the user performs some of the steps noted herein to use the service.

Next, the method processes (step 423) the user's request and allows the user to use the content distribution network and/or global traffic management network, where the user's Web pages are archived and distributed through the CDN in the manner indicated herein. The user's Web site should become more efficient from the use of such networks. Once a periodic time frequency or other frequency has lapsed (step 419), the method goes to an invoicing step, step 417. Here, the method accesses the accounting module, which can retrieve registration information about the user, service terms, invoices, accounts receivables, and other information, but is not limited to this information. The accounting module determines the service terms for the user, which has already registered. Once the service terms have been uncovered from memory, the module determines the way the user would like its invoice. The accounting module directs an invoicing step, which sends (step 427) an invoice to the user. Alternatively, the process continues until the periodic time frequency for the designated service lapses via line 422. The method stops, step 425. To finalize the transaction, an electronic mail message can be sent to the user, which is logged in memory of the accounting module.

This sequence of steps is merely illustrative, and one of ordinary skill in the art would recognize many other variations, modifications, and alternatives.

EXAMPLES

To prove the principle and operation of the present invention, we have provided examples of a user's experience using the present invention. These examples are merely for illustration, and one of ordinary skill in the art would recognize many other variations. For easy reading, we have provided a description for (I) a user's experience of a content delivery network, and (II) a user's experience of a global traffic management service, which is coupled to such content delivery network.

I. Content Delivery Network
1. Overview

In a specific embodiment, the invention provides a content distribution network. The following description contains information on how to use a graphical user interface to monitor activity, control cache, and perform checks. In some embodiments, the invention also provides a way for customer feedback to improve the service.

The present network is substantially always available. The network includes a Network Operations Center (NOC), which is dedicated to maintaining the highest possible network availability and performance. In most cases, the network is supported and staffed by specially trained service engineers, the 24-hour, 7 day NOC provides consultation, troubleshooting, and solutions for every issue. The staff can be reached through telephone, email, fax, or online.

In a specific embodiment, the network service can be used as long as the user has certain desires. For example, the user has content that needs to be delivered to end-users. This content can be delivered through HTTP, HTTPS, Streaming Media, FTP, etc. The server is for hosting the content on the Internet. For standard Web content, a caching system to distribute Web content from an origin server to a cache server that is close to a user is used. This means an origin server needs to exist that contains a master copy of the content. If the user has an existing Web site, the existing Web site may be the origin site.

In one embodiment, the present network is comprised of clusters of servers at points of presence (POPs) located on many different backbone networks around the world. The servers provide global traffic management and distribution services for various content, including support for HTTP, HTTPS, FTP and streaming media.

In a specific embodiment, the present network includes one or more services. Here, the network may offer services, including:

1. Global Traffic Management (GTM)—Provides global load balancing across multiple origin sites, along with intelligent failover and other advanced capabilities such as persistence and static mapping.
2. Content Delivery Network (CDN)—Supports content distribution and delivery for HTTP, HTTPS and FTP.
3. Streaming—Supports distribution and delivery of streaming media in many formats, such as Real Media, Windows Media, QuickTime and others.

The present CDN service has advantages. For example, the CDN service helps increase the performance of any conventional Web site or other Internet services by reducing latency problems and packet loss, and providing for content synchronization and replication. Latency problems result when the user's request travels beyond a certain distance or makes a number of network hops. When users request content from the Web or FTP sites, the requests are routed through the Internet to the server. If, as is true for many companies, the servers are located at only one site or a small number of sites, they will not be close to most of the users. Therefore, the users' requests for content might traverse many networks to communicate with the desired servers.

Latency problems are often aggravated by packet loss. Packet loss, common on the Internet, tends to worsen at "peering points," locations where different networks connect. One way to reduce packet loss and latency is to install content servers closer to users and ensure that when a user requests data, the request is routed to the closest available server. For example, Web caches, streaming, and FTP servers may be deployed throughout the Internet, on many networks close to end users. In addition, the network uses a Global Traffic Manager that routes traffic to the closest, most available and least loaded server.

The network synchronizes the content on the customer's origin site with the Web cache servers on the network. When new content is placed on an origin site and when users make requests for that content, it is automatically replicated to Web cache servers in the network. When new content is published on the origin site with a new name, it is generally immediately available from all caches in the present network. For example, the network user might add an object to the site where a similar object exists:

Add "www<dot>customer<dot>com/images/picture2. jpg" to the same site as "www<dot>customer<dot>com/images/picture.jpg."

When a request for "picture2.jpg" arrives at a cache the first time, the cache in the network determines that it does not have a copy of "picture2.jpg", and the cache will request a copy from the origin site. To keep in synchronization with the origin site, the caches periodically check the content they have cached against the copy of the content in the origin site. For Web content, this is accomplished by periodically performing an "If-modified-since" request back to the origin site to see if the content has changed. This causes content changed on the origin site to be refreshed on the caches at a predefined interval. This interval can be configured depending upon ones needs.

The periodic checking is a common feature of caches. If a piece of content is updated, the old content may be invalidated and the new content published to all the caches in the network. The present CDN service makes this "purging" possible with a cache control utility that allows a single object, a content directory, or an entire site contained in the caches to be invalidated. In a specific embodiment, cache control is available as part of the service provided to all customers that provides a comprehensive set of monitoring and administration functions for management of the Web site.

In a specific embodiment, the service runs on a secure server on the Internet and can be accessed only through a Web browser that supports secure connections (SSL). A username and password can be assigned to a user or customer.

2. Procedures

We now describe the procedures that can be used to set up the present CDN service and to monitor the performance of the Web site, including (A) Implementing the CDN; (B) Invalidating content by controlling cache; (C) Monitoring activity; and (D) Performing tests.

A. Implementing the CDN

To implement the CDN, the customer need only make minor changes to the Web pages in order to direct requests to the Web caches instead of to the origin site. The method can be as simple as changing pointers in the HTML. When a cache gets a request for content, it will return the requested object if it exists in the cache. If the content does not exist, it will retrieve the content from the origin site and return it to the user, and cache the content so that subsequent requests for that object are instantly available.

To modify the site, the customer can either: (1) change the URL; or (2) set up virtual hosting. In a specific embodiment, the site can be modified for redirecting requests by changing the URL in the HTML. The following example, a request for a picture, shows the original html and the revised html code.

Original homepage: The original homepage contains the following URL:

http://www<dot>customer<dot>com/page.html

The URL contains the following HTML:

```
<html><body>
<img src="images/picture.jpg">
</body></html>
```

Revised homepage: The "img src" tag has been revised:

```
<html><body>
<img
src="http://customer<dot>speedera<dot>.net/www<dot>customer<dot>com/images/picture.jpg">
</body></html>
```

With the original configuration, a user's browser requests the picture from the customer.com Web servers:

```
page.html from www<dot>customer<dot>com
images/picture.jpg from www<dot>customer<dot>com
```

With the revised configuration, a user's browser requests the picture from the customer<dot>speedera<dot>net Web servers:

```
page.html from www<dot>customer<dot>com
www<dot>customer<dot>com/images/picture.jpg
from customer<dot>speedera<dot>net
```

In an alternative embodiment, virtual hosting can be set up so that the user's request for content is directed to the present CDN instead of the origin site. Here, the customer can change the DNS setup to cause the domain name to resolve to the network cache servers instead of to the origin Web server. The domain name may be changed, for example, from www<dot>customer<dot>com to wwx<dot>customer<dot>com. The caches in the network can be configured in a way such that when they get a request for www<dot>customer<dot>com content they have not cached, they can make a request to the wwx<dot>customer<dot>com origin site to get the content. Here, the URLs in the Web pages may not need to be changed.

B. Invalidating Content by Controlling Cache

To invalidate the content contained in the caches, do the following:

1. Access the user interface at:
https://speedeye<dot>speedera<dot>com
2. Find the Cache Control page (see FIG. 5A) in the Content Delivery section of the interface.
3. Enter the URL in the text field.
4. Click Submit.

For example, if an image "www<dot>customer<dot>com/images/picture.jpg" is used in an URL, and the user changed the image without changing the name and the user wants the change to be immediately reflected in all caches in the network, the user could use the service to invalidate the old content, as follows:

Enter "http://www<dot>customer<dot>com/images/picture.jpg" to invalidate the individual picture, or "http://www<dot>customer<dot>com/images/" to invalidate all content in the images directory, or "http://www<dot>customer<dot>com" to invalidate all content in the domain.

C. Monitoring Activity

Figures 5A, 5B:

A user can monitor the operation of the CDN service, for example, by showing how much content is being delivered and where it is being delivered. The start section of the user interface contains a table that shows the present domains and associated origin domains an account is set up to use, as shown in FIG. 5B.

Figure 5C:
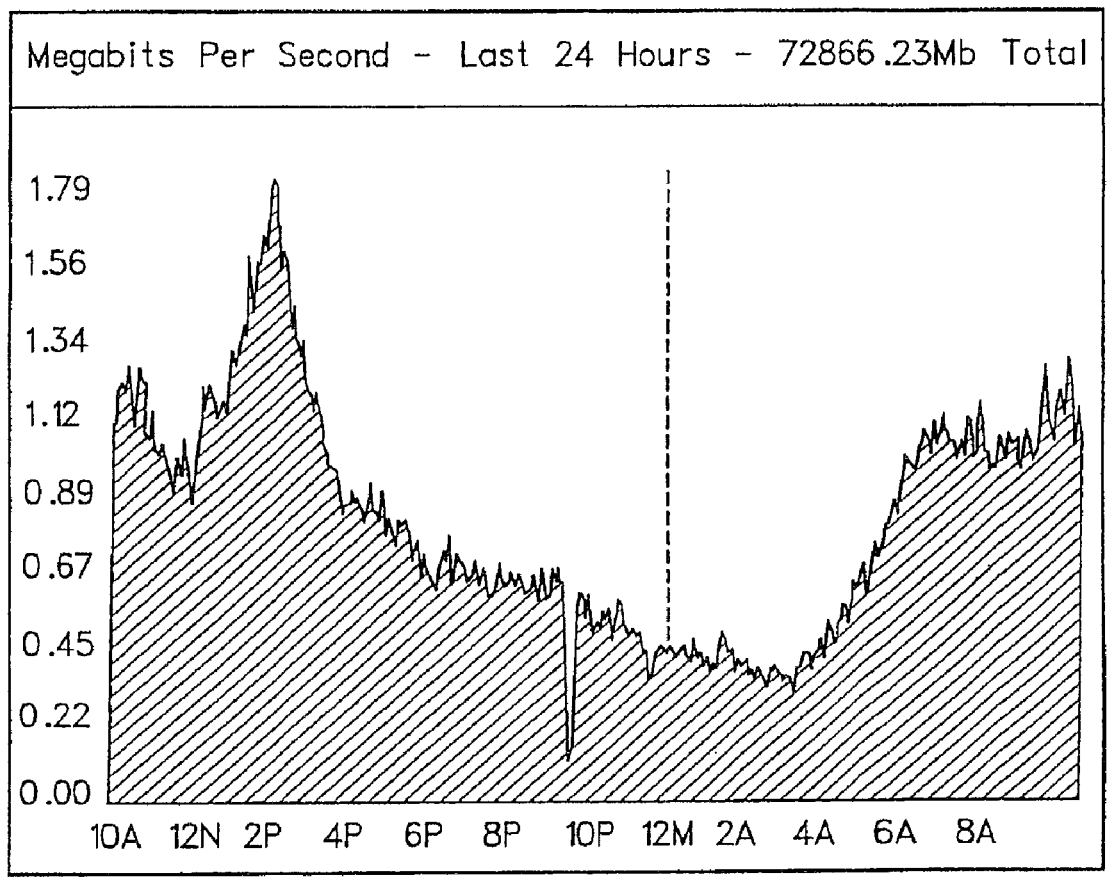

In one embodiment, recent activity can be monitored, as shown in FIG. 5C. Here, the user can view the current and last 24 hours of content delivery traffic for a given domain:

1) Access the user interface at:
https://speedeye<dot>speedera<dot>com
2) Find the Recent Activity page in the Content Delivery section of the interface.

Figure 5D:
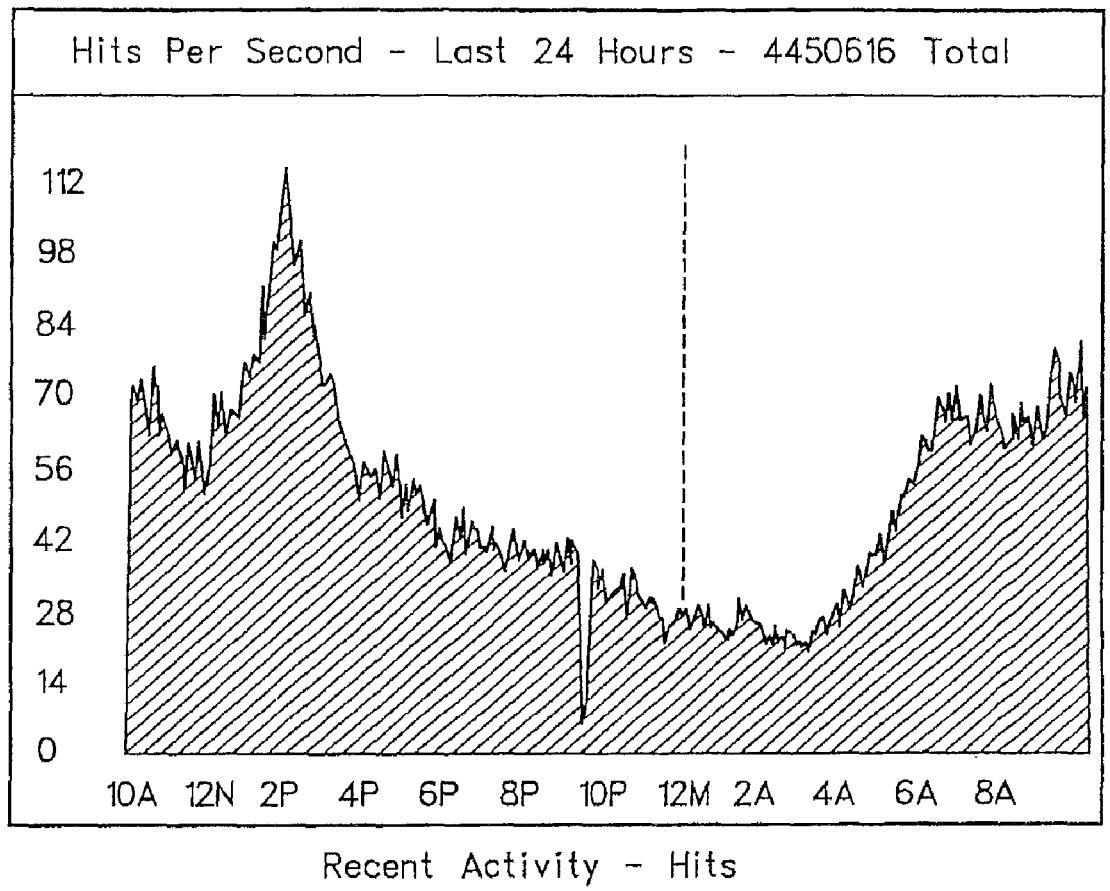

As shown, the interface has more than one graph. The first shows the amount of traffic served by the content delivery network for that domain over the last 24 hours. The current traffic is shown on the far right. A dotted vertical line separates yesterday's data on the left, and today's data on the right. A second graph on the same page (see FIG. 5D) shows the number of hits per second over the last 24 hours.

In an alternative embodiment, the method includes monitoring activity by location. Here, the user views the last 24 hours of content delivery traffic by location for a given domain:

1. Access the user interface at:
https://speedeye<dot>speedera<dot>com
2. Find the By Location page in the Content Delivery section of the user interface.

Figure 5E:
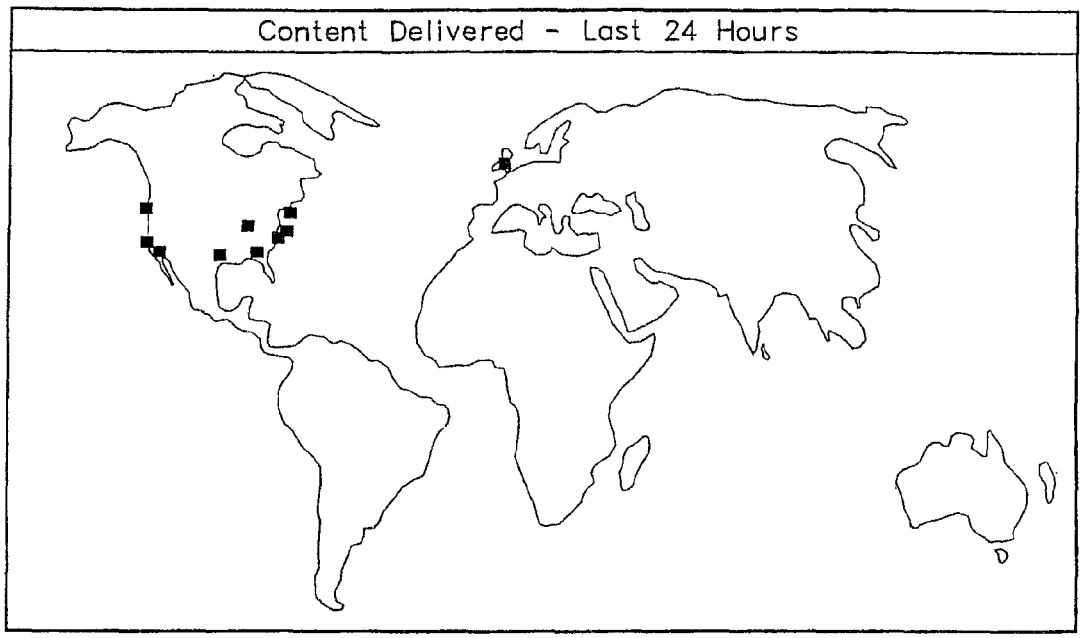
Figure 5F:
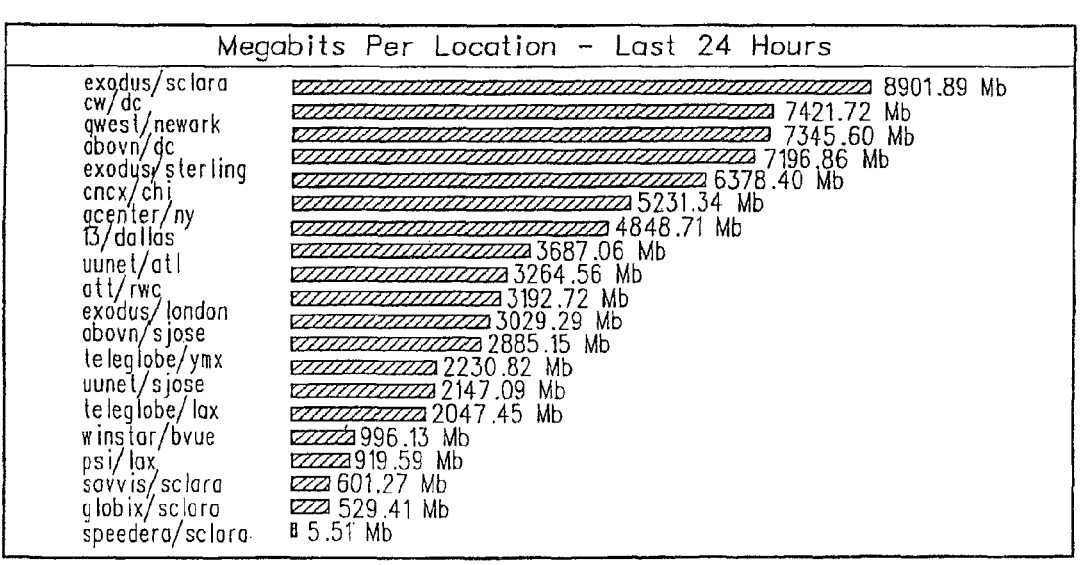

A world map appears (see FIG. 5E) that shows all the locations that served traffic for the domain. Below the world map is a bar graph (see FIG. 5F) that shows the amount of traffic served from each individual location over the last 24 hours for a given domain name. This graph is useful for many purposes, such as for determining the optimal location for a second origin site—typically, at the location serving the most traffic, where there is not currently an origin site and when that location is on a different network than the existing origin site.

D. Performing Tests

Selected tests can be performed to check performance, as follows:

1) Access the user interface at https://speedeye<dot>speedera<dot>com
2) Locate the Tests section.
3) Select the test you want to perform.

A "page check" test allows a user to check the performance of a Web page from multiple locations. To use the page check program, do the following:

1) In the text field, enter the URL to test.
2) Select the locations from which the user wants to check the page.
3) Click Check.

At that point, servers at the location(s) selected will be contacted to hit the Web page associated with the URL entered and time how long it takes to download the page and all its components. When the servers have completed downloading the page, the results are shown in the form of tables and graphs. The first table (see FIG. 5G) is the overall performance table. It appears at the top of the results.

In this example, the page took an average of 500 milliseconds to download from the first three locations (rows) and 1317 milliseconds from the last location. A server name, physical location, and network location identify each location. For example, the last location in FIG. 5G is labeled as "server-4/sterling/exodus." This label identifies a server on the Exodus network located in Sterling, Va., USA.

After the overall timetable, details for each location are presented in individual tables. FIG. 5H shows a table containing the details for the location server-14, dc, cw, a server located on the Cable & Wireless Network in Washington D.C., USA. The IP address of the actual server is shown in the heading of the table so additional tests can be performed, if needed, (traceroute and so on) on the actual server performing the test.

The Location table in FIG. 5H shows data for the www<dot>speedera<dot>com Web site. The graph shows the performance for downloading specific components of the page. This table shows that the majority of the time spent in the download was spent downloading the home page itself. The remainder of the content (all the gifs on the subsequent lines) has been cached and is delivered from the closest and least loaded available server within the CDN, in a fraction of the time. These cached items have a domain name of www<dot>speedera<dot>net.

In a specific embodiment, colors in the graph can be used to show the different components of the download including the DNS lookup time, connect time, and so on. The first time a page is checked, the DNS times will likely be very high. This high reading results from the way DNS works in the Internet. If a domain name is not accessed within a specific amount of time (the timeout period), the information will expire out of the DNS caches. The first request will again need to walk through the Internet's hierarchical system of DNS servers to determine which one is authoritative for a given domain name.

To get more accurate results, a page can be hit twice, where the results from the second hit are used. This will give a more accurate representation of what the performance is like when the page is being hit on a regular basis. The graph is followed by the actual raw data that make up the graph. Each row displays the following elements:

URL. The URL component downloaded

IP Address. The IP address of the server contacted to get the data

ERR. The error code (where 0 is no error)

HRC. The HTTP response code (where 200 is OK)

LEN. The length of the data downloaded

CHK. A checksum of the data

STT. The timing in milliseconds for the start time

DRT. DNS response time in milliseconds

COT. Connection Time—Syn/SynAck/Ack Time

DST. Data start time when first packet is downloaded

FNT. Final time when download is complete

END. The total millisecond timings for portions of the connection

Global Traffic Manager

A global traffic manager coupled to the CDN is provided. The following provides a description of the global traffic manager. The description is merely an illustration, and one of ordinary skill would recognize many other variations.

1. Overview

To use the Global Traffic Management service, the following techniques can be used:

A. Domain Name Representing a Service.

The domain name can be delegated for which the users are authoritative so that the present servers are contacted to resolve the domain name to an IP address, or addresses. Alternatively, a domain name can be created. That name will end with speedera.net, such as customer<dot>speedera<dot>net.

B. More that One Ip Address Associated with that Service.

Obtaining more that one IP address for a given service provides the following benefits from the Global Traffic Management service:

- Provides better service for clusters of servers on multiple networks. If a location within a cluster fails, or the network associated with that location fails, the system can route traffic to another available network because there is more than one IP address. The system also provides better performance by sending user requests to the closest cluster of servers.
- Provides better service for clusters of servers on a single network. If each computer has a different IP address, the Global Traffic Management service can be used to load-balance between individual computers.
- Reduces latency for a single cluster of servers that is attached to multiple network feeds. In this configuration, the Global Traffic Management can route around network failures by testing each of the network connections and by routing user requests to the closest working connection.

In a specific embodiment, the network is comprised of clusters of servers at POPs located on many different networks around the world. The servers provide global traffic management and distribution services for content of many kinds, including support for HTTP, HTTPS, FTP, and multiple varieties of streaming media, as noted above.

The GTM service routes requests to the closest available and least-loaded server. The service also tests the servers it manages for service performance and availability, using actual application-level sessions. When a service test fails, the system reroutes the traffic to other available servers. The GTM service is based on Domain Name Service (DNS). The Internet uses the DNS to allow users to identify a service with which they want to connect. For example, www<dot>speedera<dot>com identifies the Web service (www) from speedera.com.

When users request a service on the Internet, they request it by its DNS name. When a user enters a domain name, domain name servers on the Internet are contacted to determine the IP addresses associated with that name.

The Network includes specialized domain name servers that use advanced mechanisms to determine the IP addresses associated with a given domain name and service. These servers work seamlessly with the Internet DNS system. To determine the best IP address, or addresses, to return when a user requests a service on the Internet, the DNS system does the following:

1. Uses IP addresses to monitor the performance of a service on individual computers or clusters of computers.
2. Determines latency and load metrics between users and servers on the Internet.
3. Performs tests on the Internet to determine the quality of service a user would receive when connecting to a specific computer or cluster of computers.

2. Procedures

This section describes procedures to implement and monitor the performance of the Global Traffic Management service. The customer or user may perform the following procedure:

1. Sign up for the service.
2. Contact the server location and provide the following information: The domain name of the service the system is to manage; The IP addresses associated with that service; A description of the service and how it should be tested for performance and availability; The interval after which tests should be performed; What the service check should look for, such as specific information in a returned Web page; Whether the user would like traffic weighted so that more traffic is sent to one IP address over another.

In addition to the normal routing around failures to the closest server, the system can also be set up for security purposes. The system can contain hidden IP addresses that are only given out in the case of failure of other IP addresses. The user might want to use this feature to prevent a denial of service (DoS) attack. If one IP address is attacked and becomes unavailable, another will then appear and traffic will be routed to it. This can make attacking a Web server more difficult since the IP address is not published until the failure occurs.

Figures 6A, 6B:
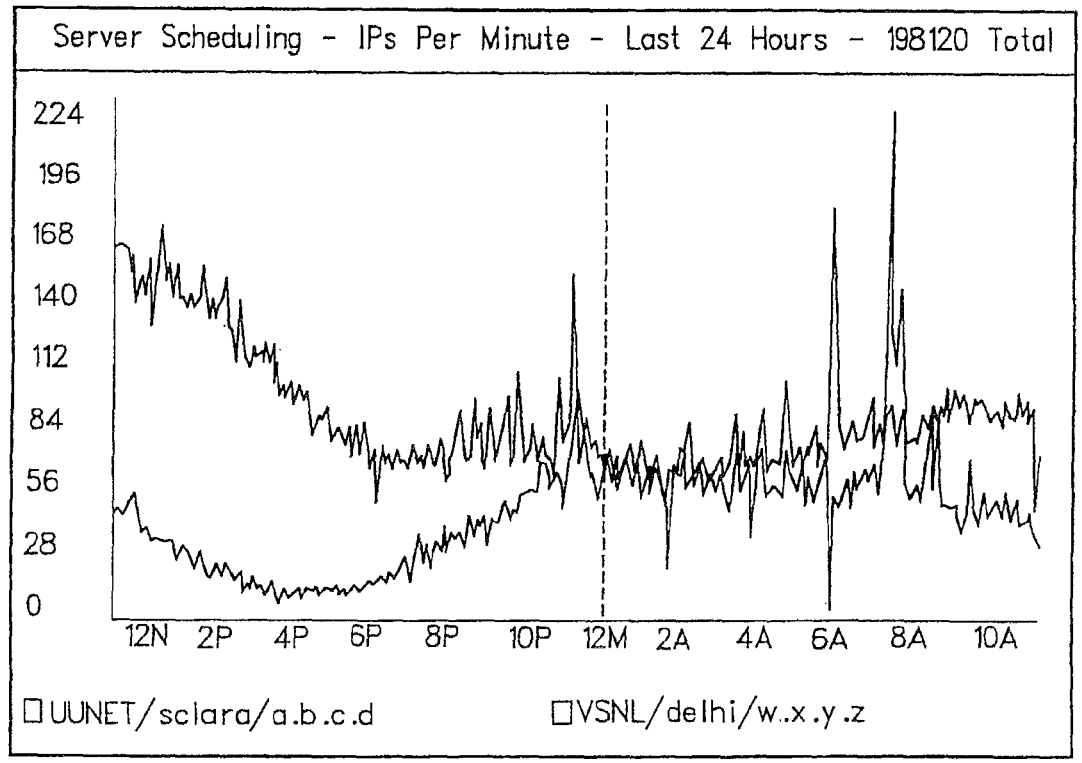
FIGS. 6A to 6E are simplified diagrams of global traffic management system according to an embodiment.

A user can monitor the operation of the Global Traffic Management service for domain names. Preferably, information is displayed on a Web-based user interface that runs on a secure server on the Internet that can be accessed only through a Web browser that supports secure connections (SSL). Here, a start section of the user interface contains a table that shows all the domains and associated origin domains the account is set up to use. See FIG. 6A.

For example, the last 24 hours of traffic management activity for a given domain can be viewed by:

1) Access the user interface at https://speedeye<dot>speedera<dot>com

2) Find the Recent Activity page in the Traffic Management section of the interface.

The main graph in the page shows how traffic was routed over the last 24 hours. A dotted vertical line separates yesterday's data from today's data. The lines in the graph show how many times each IP address was given out. See FIG. 6B.

In the example, the present Global Traffic Management system made 198120 traffic routing decisions over a 24-hour period. The lower decision line in the graph represents an IP address for "Delhi, India." The upper decision line represents an IP address for "Santa Clara, Calif.; United States." The Y axis represents the activity levels. The X axis represents the Santa Clara time: N for noon, P for p.m., A for a.m.

At 6:00 a.m. in Santa Clara, one line dropped to the bottom of the graph and the other spiked upward. This happened because the system routed around a failure at a data center. When the "Delhi" IP address failed its service test, the Global Traffic Management system routed traffic to the "Santa Clara" IP address.

The example also shows that the "Delhi" IP address is more active at night (Santa Clara time), and the "Santa Clara" IP address is more active in the daytime. The difference in activity results from the changes in time zones. When people in India are active, the traffic manager routes their requests to the closest available server with the best service response time. For users in India, when it is their daylight and their peak time, the best IP address is often the site in Delhi. For users in the U.S., when it is their peak time, the best IP address is the site in Santa Clara.

Alternatively, the last 24 hours of traffic management activity by location for a given domain can be viewed:
1. Access the user interface at: https://speedeye<dot>speedera<dot>com
2. Find the By Location page in the Content Delivery section of the user interface.

Figure 6C:
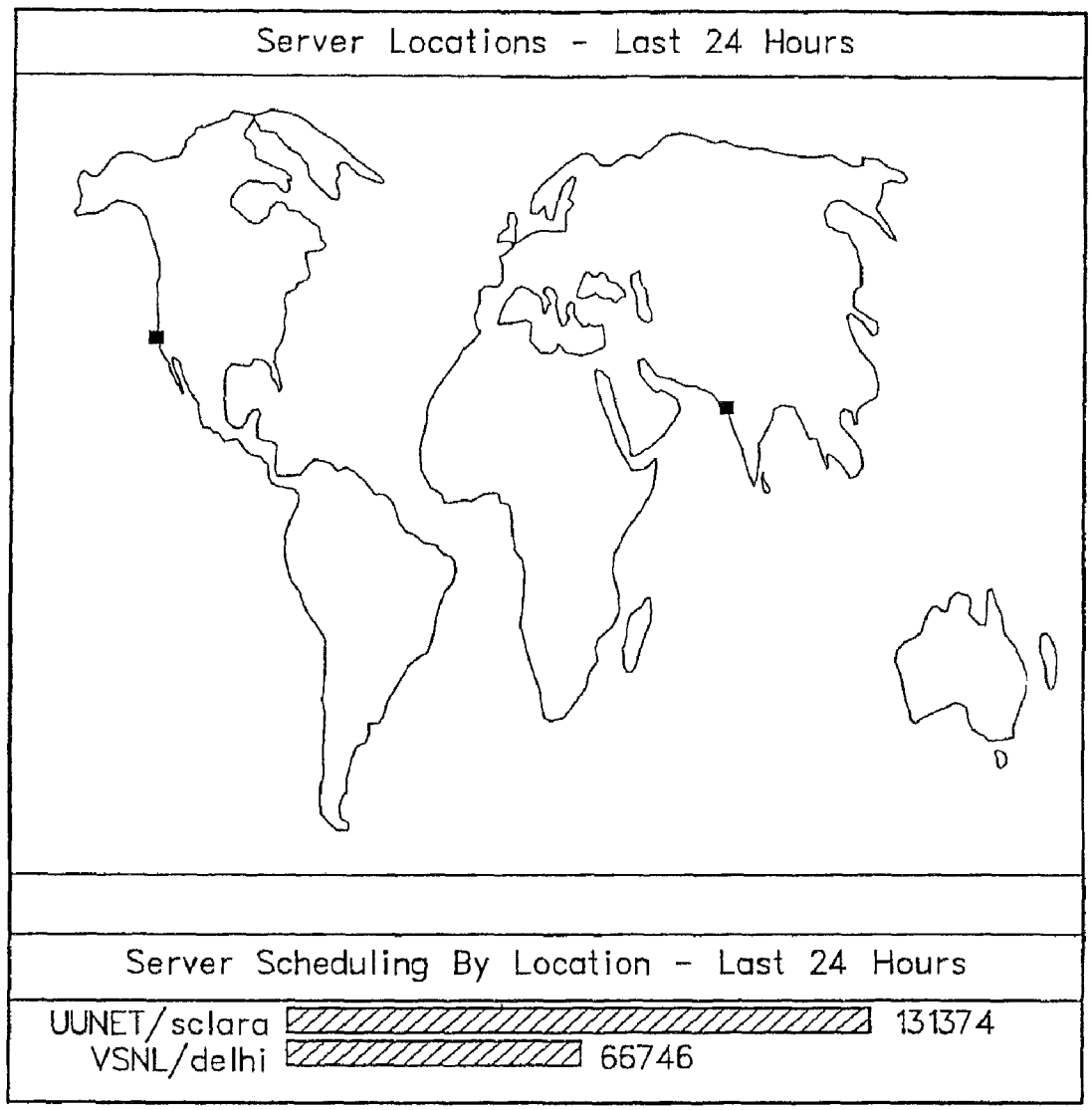

Here, a world map and a bar chart appear. They show where the traffic manager routed traffic (geographic and network locations) over the last 24 hours for a given domain name. See FIG. 6C. The bar-chart example shows the number of times each location was chosen to serve traffic over the last 24 hours. In the example, the traffic manager chose the "UUNET/sclara" (Santa Clara, Calif.; United States) location to serve most of the traffic.

In other aspects, the interface also contains a utility that allows the user to check a Web page from multiple locations. If an HTTP service is used, a quick status check can be executed as follows:
1) Access the user interface at https://speedeye.spedera.com
2) In the text entry field, enter the URL for the page to check.
3) Select the locations from which you want to check the page.
4) Press the Check button. This causes servers at the location, or locations, selected to download the Web page associated with the URL entered in Step 2.

Figures 6D, 6E:
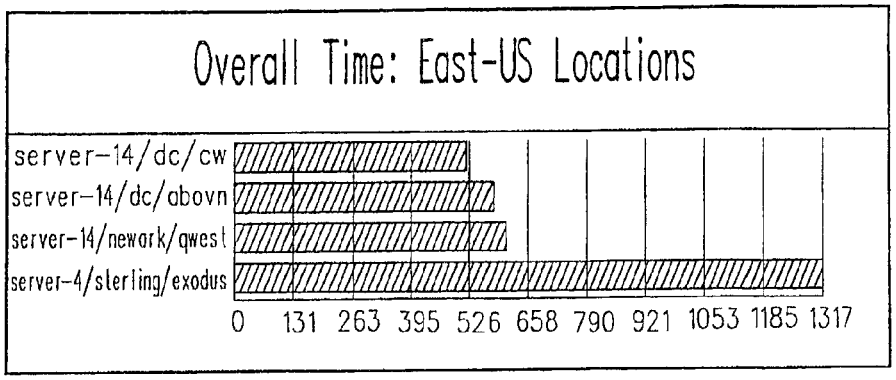

When the servers have completed downloading the page, the page-performance results are shown in the form of tables and graphs. The first table (see FIG. 6D) is the overall performance table. The graph in FIG. 6E shows the performance for downloading specific components of the page. This table shows that the majority of the time spent in the download was spent downloading the home page itself.

Colors in the graph can be used to show the different components of the download including the DNS lookup time, connect time, and so on. To get more accurate results, a page can be hit twice and the results from the second hit can be used. This will give a more accurate representation of what the performance is like when the page is being hit on a regular basis. In the Location Table, the graph is followed by the actual raw data that makes up the graph. Each row displays the following elements:

URL. The URL component downloaded
IP Address. The IP address of the server contacted to get the data
ERR. The error code (where 0 is no error)
HRC. The HTTP response code (where 200 is OK)
LEN. The length of the data downloaded
CHK. A checksum of the data
STT. The timing in milliseconds for the start time
DRT. DNS response time in milliseconds
COT. Connection Time—Syn/SynAck/Ack Time
DST. Data start time when first packet is downloaded
FNT. Final time when download is complete
END. The total millisecond timings for portions of the connection In a specific embodiment, the Global Traffic Management (GTM) system automatically routes around failures to services on the IP addresses it manages. Here, the system can also: Add or remove a domain name from the system; Add or remove IP addresses from the system; and Change the way a service is monitored.

Speedera DNS Server

The Speedera DNS server (SPD) is the core component of the Speedera GTM solution and provides load balancing across the servers distributed all over the Internet. The SPD acts as the traffic cop for the entire network. It handles the DNS requests from clients, resolving hostnames to IP addresses. SPD makes the decisions about which IP address to return for a given hostname based on the static mapping of hostnames to the servers (configuration file), information it collects about the state of the servers in the network (service probes), information about the network latency from the servers to the client (latency probes), the packet loss information for the POP (packet loss probe), bandwidth usage for the POP (SERVPD) and static latency information (client configuration). This enables requests to be directed to the servers that are best suited.

If SPD cannot answer the request, it will forward the request to the named server. This allows SPD to handle only the queries that are relevant to the GTM solution. SPD handles the following type of queries:
A Records
PTR Records
SOA Records
LOC Records
NS Records
ANY Record SPD server is designed to work around problems in the network. It can handle a single server or a single POP failure. It can also work around more catastrophic failures such as all latency probes going down. In these extreme cases, the load balancing will not be optimal, but the SPD and the entire Speedera Network will still function.

SPD supports a two-tier architecture that can be used to increase the number of DNS servers in the system to more than the maximum allowed for .com domains. It can also be used to direct the client DNS servers to the closet Speedera DNS servers.

SPD logs the statistics about the IP address it gives out in response to incoming requests. This can be used to monitor the effectiveness of the GTM solution in distributing load across multiple servers.

Figure 7:
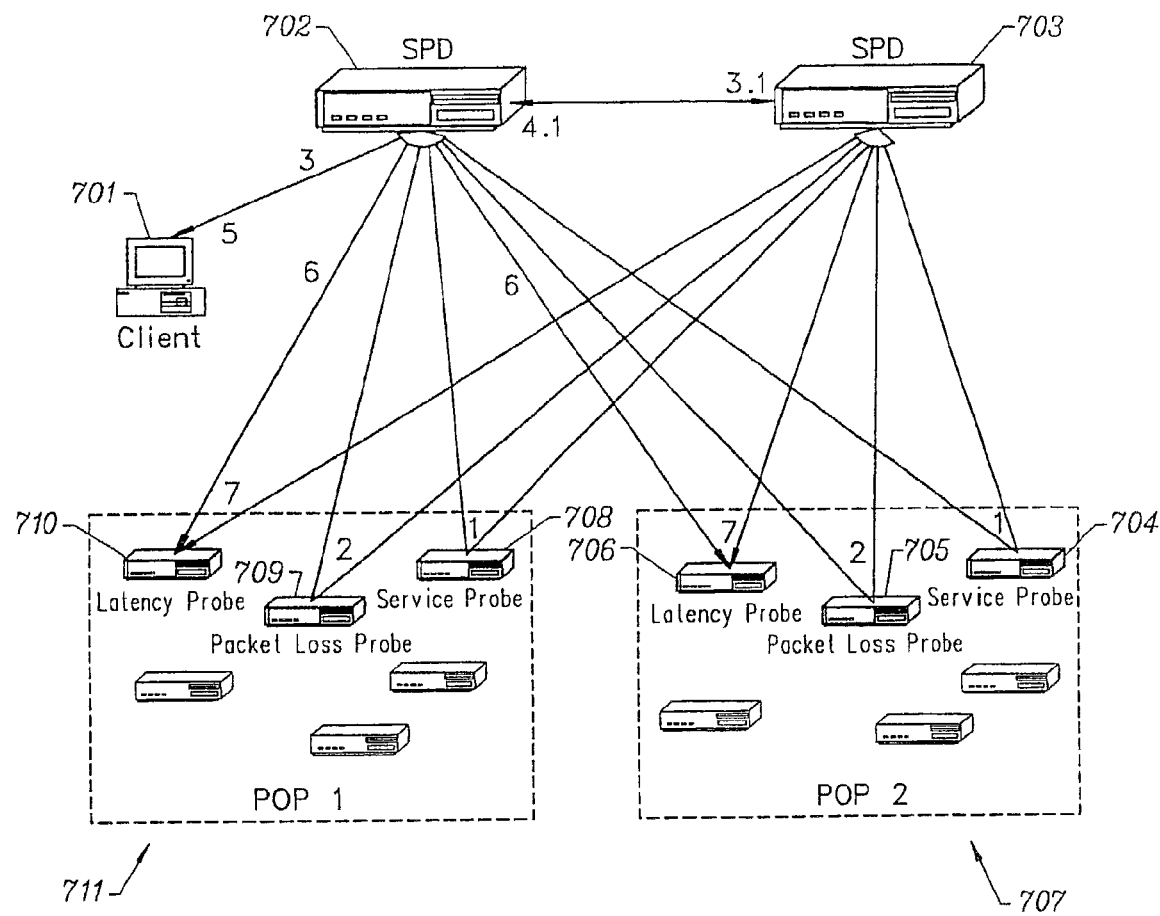
FIG. 7 is a block schematic diagram showing the interaction between the Speedera DNS Server (SPD) and other components according to an embodiment.

Referring to FIG. 7, the SPD is highly scalable; it uses hashing tables optimized for block memory allocation to speed up access to all the internal tables. It can easily scale to handle thousand of servers and hostnames in the network. The only limiting factor is the amount of physical memory available on the servers. FIG. 7 shows how SPDs interact with other components.
1. SERVPD 704, 708, sends the load information about all the servers in the POP 707, 711, to all the SPD servers 702, 703, periodically. This information is also used to update the bandwidth usage for the POP 707, 711.

2. SPKT 705, 709, sends the packet loss information to all the SPD servers 702, 703, periodically.
3. Client DNS 701 sends a DNS request to SPD server 702.
   3.1. If the SPD server 702 is not responsible for the zone in which the client address falls, it forwards the request to one of the SPD servers 703 responsible for the zone.
4. SPD 703 uses the cached latency, load and packet loss values to determine the address to return. SPD 703 collects all the probe information asynchronously to improve the response time for the DNS requests.
   4.1. If it was a forwarded request, SPD server 703 sends the response back to the SPD server 702 that forwarded the original request.
5. SPD 702 sends the response back to the client
6. SPD 702 sends a Latency request to LATNPD 706, 710. If the probe method for the client 701 is specified in the client configuration file, it sends the probe method to be used along with the latency request. SPD 702 sends latency requests only for the servers configured for the hostname for which it got the DNS request. Latency requests are only sent for the servers with dynamic latency value and if latency is factored into the load balancing algorithm.
7. LATNPD 706, 710, probes the client 701 to determine the latency and sends the latency information to all the DNS servers in the same zone.

Configuration Files

The configuration file contains all the static information about the Speedera Network. It contains the list of POPs and the servers present at each POP. It also contains the list of hostnames serviced by the Speedera Network and maps the hostnames to the servers that can serve the content for that hostname. Most of the parameters needed to configure SPD are contained in the configuration file and can be used to fine-tune the load-balancing algorithm, frequency of probes etc.

In addition to the main configuration file, there is a client configuration file that can be used to specify static latency from a client to various servers in the network, and to specify the latency probe type for a given client. It can also be used to specify conditions under which a client is probed (e.g., never, always, in case of a server failure).

Service Probes

Service Probe Daemon (SERVPD) periodically probes all the servers in the POP and sends the status information back to all the SPD servers in the Speedera Network. There is one service probe for each type of service that is supported by the GTM. This allows the fine tuning of each service probe to return the load metrics that accurately reflect the load on the server for that service. For example, for HTTP the time taken to retrieve a standard Web page from the Web cache can be used as the load metrics. There is also a generic load probe that measures the CPU and memory utilization of the servers. This probe can be used as the load metrics for the services for which there are no custom service probes. Currently there are custom service probes for HTTP, HTTPS, FTP and streaming servers.

The load information is used by the SPD to make the decision about which server to return. SPD keeps track of how old the load information is, so that if the entire POP goes down, it can detect it by simply looking at the load timestamp. If the load information for a server is stale, or the server is down, the SPD tries not to direct any traffic to that server.

The special service type of NOLOAD has a static load value of 1 and its time stamp is always current. This service type can be used to load balance services for which there is no probe, and are assumed to be always up. It can also be used to effectively factor server load out of the load-balancing algorithm.

Bandwidth Probe

There is no separate bandwidth probe. The SNMP probe in SERVPD is used to measure the bandwidth utilization for the switch. The aggregate bandwidth usage for POP is measured as the sum of the load metrics for all the servers in the POP with the service type of "SWITCH".

Latency Probes

Latency Probe Daemon (LATNPD) is used to determine the network latency from a POP to the client. Whenever SPD gets a request from a client, it sends a latency request for that client to the latency probes. The latency probes then find the network latency from the POP to that client and return it to all the SPD servers in the same zone. LATNPD uses a number of different probes to determine the latency. Multiple probe types are required since all the clients do no respond to a single probe type. Probe types include PING, DNS PTR, UDP packets to high ports looking for a noport responses as well as any others that may generate a reply without spending much time at the target location. The order in which these probes are used to determine the latency can be configured using the configuration file. The type of probe used to determine the latency for a given client can also be specified in the client configuration file.

SPD sends latency requests only for the servers configured for the hostname for which it got the DNS request. Latency requests are only sent for the servers with dynamic latency value and if latency is factored into the load balancing algorithm.

Both LATNPD and SPD cache the latency information. SPD sends a latency request only to a subset of the latency probes and it sends the request only if the latency information it has is stale. LATNPD does a probe only if the latency information it has is stale, otherwise, it returns the values from its cache in order to reduce the amount of traffic generated from the latency probes to the client machines. To further reduce the latency probe traffic, static latency information can be input into SPD. SPD also saves the dynamic latency tables across system shutdowns to reduce the latency traffic at startup.

Packet Loss Probes

The Packet Loss Probe (SPKT) is used to determine the packet loss for a POP. A limited subset of SPKT daemons probe all the POPs in the Speedera Network to determine the packet loss for the POPs and report it back to SPD. Only a limited subset of POPs do the actual probing to reduce the amount of network traffic. The probe interval, number of POPs doing the probing, packet size, and number of packets used to determine the packet loss can be fine tuned using the configuration file.

Persistence

SPD also supports persistence. For persistent hostnames, SPD returns the same IP addresses, for a given client. The SPD server maintains a table containing the IP address used for a given hostname to a client. This table is created dynamically in response to incoming requests and is synchronized across all the SPD servers responsible for a given zone. If the same client tries to resolve the hostname against a different SPD server in the future, it will get the same result. Also, access and refresh timeouts for the persistent entries can be configured on a per hostname basis.

Zones

To reduce the memory requirements and network traffic, the entire Internet address space is broken up into multiple zones. Each zone is assigned to a group of SPD servers. If an SPD server gets a request from a client that is not in the zone assigned to that SPD server, it forwards the request to the SPD server assigned to that zone. The SPD servers keep latency and persistence information only for the clients that fall in their assigned zones. The latency probes only send the client latency information back to the SPD servers responsible for that client. Also the SPD servers only need to synchronize the persistence table with the SPD servers responsible for that zone, not all the SPD servers in the network.

Each SPD server probes all the other SPD servers to determine the latency. When SPD forwards a DNS request to servers in the other zone, it selects the server with the best (lowest) latency value. This allows the SPD server to dynamically load balance between the SPD servers in the same zone and avoid servers that may be down or are having some other problems.

In the DNS response SPD includes the SPD servers that are authoritative for a given client address. That way the client can query the authoritative name servers directly next time, avoiding the delay involved in forwarding the DNS request from one SPD server to another.

Two Tier Architecture

SPD supports a two-tier architecture that can be used to increase the number of DNS servers in the system to more than the maximum allowed for .com domains. It can also be used to direct the client DNS servers to the closest Speedera DNS servers and to prevent the client DNS server from flip-flopping between all the DNS servers authoritative for speedera.net domain.

When returning the NS records, the normal load balancing is performed to determine the SPD servers that are best suited to handle the queries for the client and return only those NS records. This helps in directing the client DNS server towards the SPD servers that is best suited to handle the queries for it.

To support the two-tier architecture the hostname entries are dynamically mapped in the configuration file to the second tier domain names (www<dot>speedera<dot>net to www<dot>edge<dot>speedera<dot>net). SPD provides support for any number of second level domains. The "edge" and "persistent" domains are special domains that are used for the dynamic transformation of the host names.

The persistent<dot>speedera<dot>net domain is used to handle all the persistent hostname queries. If the "persistent" domain is not defined then the root domain (speedera<dot>net) is used to handle the persistent queries.

The following algorithm is used to generate the mapped hostnames and validate the hostnames in the configuration file:
1. Get the domain authoritative for the hostname, using longest suffix match. Root is authoritative for all the hostnames that do not have the speedera.net suffix.
2. If the hostname is of the type GTM and persistent
    a. If persistent domain is defined and the authoritative domain for the hostname is not persistent<dot>speedera<dot>net then flag an error
    b. If persistent domain is not defined and the authoritative domain for the hostname is not root then flag an error
3. If the hostname is of the type GTM do not do the mapping
4. If the hostname is persistent and a domain other than the root is authoritative for that hostname and if persistent domain is defined and the authoritative domain for the hostname is not persistent<dot>speedera<dot>net then flag an error
5. If the hostname is persistent and a domain other than the root is authoritative for that hostname and if persistent domain is not defined flag an error
6. If a domain other than the root is authoritative for the hostname do not do the mapping
7. If the hostname is persistent and "persistent" domain is not defined, do not do the mapping.
8. If the hostname is not persistent and "edge" domain is not defined, do not do the mapping.
9. If the hostname is static do not do the mapping.
10. If the hostname is persistent, MapDomain is persistent<dot>speedera<dot>net.
11. If the hostname is not persistent MapDomain is edge<dot>speedera<dot>net.
12. If the hostname belongs to one group of servers and uses global load balancing parameters, map the hostname to <service>-<group>.<MapDomain>
13. Remove the domain suffix from the hostname
14. Map the hostname to <prefix>.<MapDomain>

The Speedera Network may consist of a number of Linux machines running Speedera software. Speedera software consists of eight components that are delivered as a single product. When deployed across a large number of machines, it creates a network that provides a complete solution for content hosting and delivery.

Customers can store content such as HTML, images, video, sound and software in the network for fast and highly available access by clients. The network also provides load balancing and high availability for servers outside the network. Customers with generated content, such as search engines, auctions and shopping carts, can use the latter feature to add their own content servers to the network.

The system requires no software or hardware to be installed or run at a customer site, and can be monitored using a standard Web browser. It provides an HTML interface that displays the network's current status as well as historical statistics.

Software Components

The system is comprised of the following distinct software components: (1) NameServer; (2) WebCache; (3) Streaming Media Servers; (4) FileSync; (5) NetProbes; (6) LogServer; (7) NetView; (8) AdminTools; (9) Shared. Each is described below.

NameServer

DNS server software that performs name to IP address mapping. When queried to resolve a name from a client's DNS server, it returns an IP address that has the ability to serve content for that name and that is best suited to handle the request in terms of load (service health), latency, packet loss and availability. The DNS server writes log information to files that are picked up and maintained by the LogServer software.

WebCache

Caching Web server software is used to deliver content by responding to requests for Web content from clients (Web browsers). If the requested content does not exist in memory, it will generate a request to an origin site Web server to fetch the content. The caching servers write information about the content delivered to log files that are picked up and maintained by the LogServer software.

Streaming Media Servers

The streaming media in the servers can be off the shelf streaming media servers including ones from Real Networks, Microsoft and Apple. A logging system allows the logs to be picked up by the LogServer software and plugins allow the configuration of the servers remotely.

FileSync

The FileSync software is the infrastructure to support publishing files and synchronizing them to many locations. These are used to publish large download files and to publish on-demand streaming media files to streaming media servers.

NetProbes

A number of probes including probes that:

Determine server load and availability (e.g., service health, load and availability)

Determine packet loss and latency problems on links in the network

Perform content checks to ensure servers are delivering correct content

Determine latency between points on the network and clients of the network

Perform ongoing monitoring of services

Probes run constantly and send results to servers running NameServer software, and log results to a log file that is picked up and maintained by the LogServer.

LogServer

Server software that picks up log files and then transmits them, receives them in a central location, stores them on disk, breaks them out into categories and processes them to generate statistics and monitoring information. The software also responds to requests for current and historical information from servers running NetView software.

NetView

Server software that provides an HTML interface to current and historical statistics for end-customers and network operations. Information about the network is obtained from servers running LogServer software. Web server CGI programs are used to provide the HTML user-interface. NetView software also provides an interface that allows customers to flush content from the network as they update the content on their servers, manage files in the network, and set up live streaming events.

AdminTools

Tools to configure and administer the site including tools to spider a Web site to load the caches with content and tools to update the global configuration file.

Shared

A set of client and server programs that all the various software components require. This includes a server that transmits and receives configuration files. Installing this software is not an option. It is installed automatically when any one of the other software components is installed.

Any combination of the software components (with the exception of "Shared" which is always installed) can be installed on a single machine. In a normal deployment, however, many machines will serve a single purpose (DNS name server, for instance) and will only have one of the software components installed.

How the System Operates

The Speedera Network consists of a number of server machines installed at various POPs around the world. Each POP will contain some mix of the Speedera software. The majority of POPs will contain NetProbes and WebCache software. NetProbes software performs network latency probes from each POP to determine the latency from users to the POP, and will also run probes against other POPs and perform content verification to ensure machines at the various POPs are operating correctly.

A number of the POPs are outfitted with large disk storage and contain Streaming Media servers and FileSync software. A limited number of POPs will contain NameServer software to perform traffic management for the whole system.

The Speedera Network Operations Center (NOC) contains NetView, AdminTools and LogServer software. Two NOCs can be created for redundancy and in the case of the failure of one, the backup NOC should pick up automatically.

Figure 8:
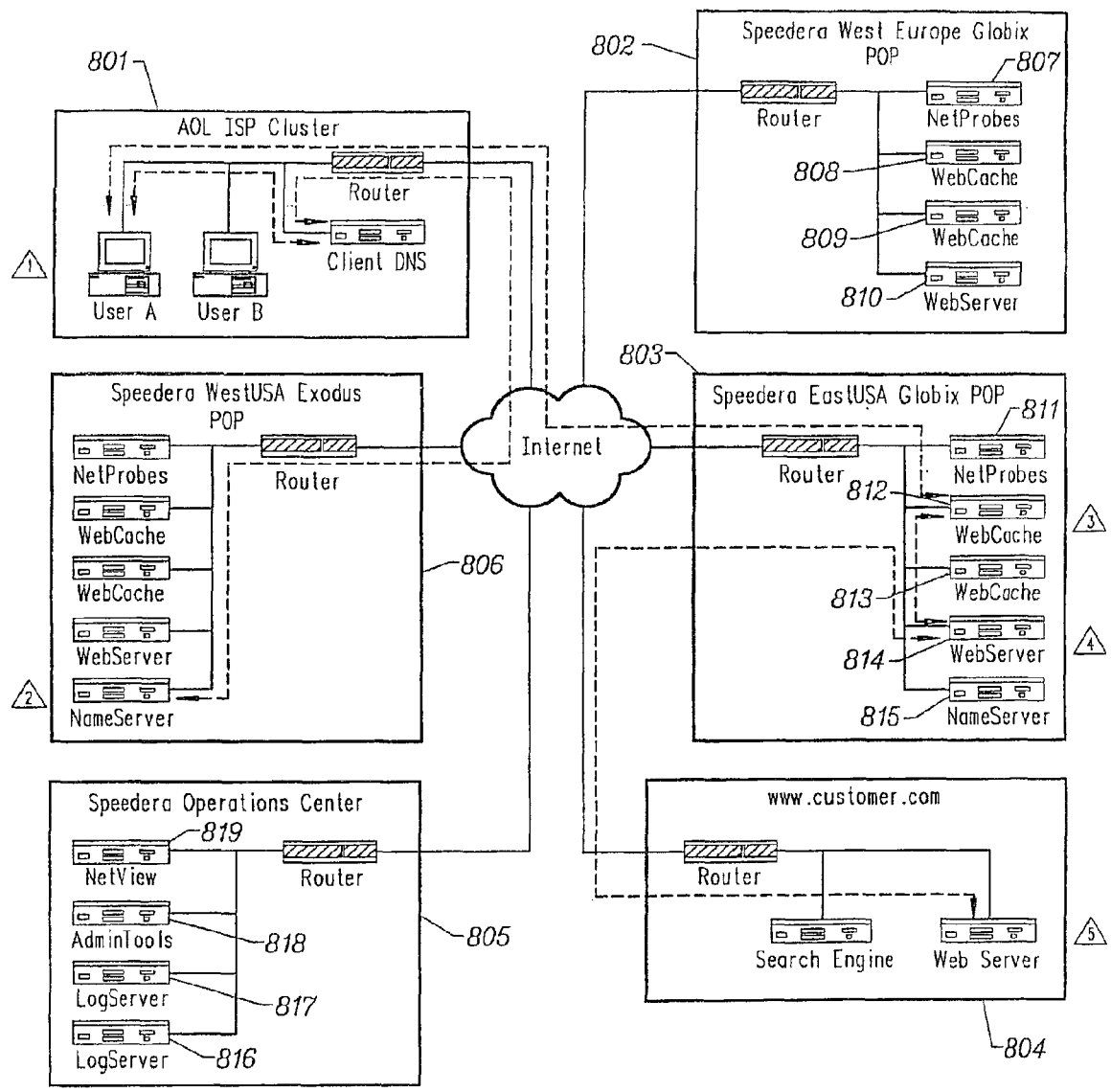
FIG. 8 is a block schematic diagram showing a POP Speedera network with the invention's software components distributed among POP servers and Network Operations Centers according to an embodiment.

With respect to FIG. 8, a four-POP Speedera Network is shown. The dashed lines and triangles in the diagram show the path network traffic follows when a piece of stored content is initially published to the network. Three content delivery POPs 802, 803, 806, and one NOC 805 are shown.

As stated above, the POP servers contain a mix of Speedera software. POP 802 contains NetProbes 807, WebCache 808, 809, and WebServer 810. POP 803 contains NetProbes 811, WebCache 812, 813, WebServer 814, and NameServer 815. The NOC 805 contains NetView 819, AdminTools 818, LogServer 817, 816.

Customers of the Speedera Network will maintain their own Web server (or servers) with their copy of their content on it. They don't have to change the way they test and manage their Web site in any way to use the content hosting service.

The Speedera network provides two primary services. First, it provides content hosting for content that can be cached and stored (images, video, software, etc.). Second, it provides load balancing and traffic management for services that can't be stored. The latter is used to load balance search engines, shopping engines, etc. The network also contains other services including monitoring and live streaming.

Content Hosting

To host HTTP or HTTPS Web content on the Speedera network, customers either delegate a DNS name to Speedera or host content under a speedera.net domain name.

In the former case, the customer might delegate "images<dot>customer<dot>com" to Speedera's DNS servers using a CNAME or by directly delegating the domain. If the customer already uses an images.customers.com domain (some customers use this method for static content, e.g., eBay uses pics.ebay.com) they wouldn't need to make any changes to their Web site to have their content published to the network. The Speedera network gets all hits to images<dot>customer<dot>com and any time the Speedera network gets a hit for content it does not contain, it goes back to the customer's Web site to retrieve the content, and store it in the system. Once stored in the system, the customer's Web site is not hit for that piece of content again.

When a customer updates its Web site, it can tell the Speedera network that the content was updated by entering its URL on a Web page used by Speedera customers to invalidate content. If multiple changes to their Web site are made, they can invalidate whole trees of content or simply the whole Web site. In the latter case, their Web site would be flushed from the system and the next hit would cause the content to be grabbed from their Web site.

Alternatively, the Web cache could make if-modified-since requests back to the origin site at specified intervals to check to see if the content it has cached is fresh. Also, the cache can look at expiry headers in the HTTP content it retrieves from the origin site to ensure freshness.

If the customer uses the speedera.net domain name to host their content, they don't need to delegate a domain name to Speedera. Speedera will create a "customer<dot>speedera<dot>net" domain name and associate it with some portion of the customer's Web site. If customer<dot>speedera<dot>net gets a hit for content it does not contain, it will hit the customer's Web site to pick up that content and store it in the network.

In both cases, the path network traffic flows is similar. Consider the case where the customer has delegated images<dot>customer<dot>com to Speedera to host their images. The path of the first user request is as follows:
1. User hits www<dot>customer<dot>com generating a DNS request to their client DNS
2. Request to resolve www<dot>customer<dot>com from client DNS to customer.com DNS server
3. customer.com DNS resolves the name to the customer's Web server IP address
4. Web page is returned to user
5. Web page has embedded tags to get images from images.customers.com
6. Request to resolve images<dot>customers<dot>com goes to a Speedera DNS server
7. NameServer software on the DNS server returns the Speedera WebCache IP address that is closest to the user, available and least loaded
8. WebCache does not have the content for the request so it performs HTTP request to the customer's Web site to obtain the content The next time the request for the same content comes through the system, it will come directly from the cache. If a customer hosts content off the speedera.net domain name (customer<dot>speedera<dot>net), the process is exactly the same as the process when the content is hosted on a name delegated by the customer.

Load Balancing and Traffic Management

Another service the Speedera network provides is load balancing and traffic management for servers that aren't in the network. By combining traffic management and content hosting, the network can provide a complete load balancing and high availability solution for Web sites.

The network provides load balancing at the DNS level. As in content hosting, the customer will either delegate a DNS name to Speedera or be assigned a speedera.net domain name. When the Speedera DNS server receives a request to map a name to IP address it will return an IP address that is best suited to handle the response. The IP address returned will be the server that is closest to the user (latency), has the least load and that is available and can handle hits to that domain name.

The DNS level load balancing will commonly be used in combination with content hosting. When both are used in combination, the path a user request follows is:
1. User hits www<dot>customer<dot>com generating a DNS request to Speedera DNS
2. Speedera DNS determines which customer Web server is best to handle request
3. Customer's Web server generates main page and returns to user
4. Web page has embedded tags to get images from images.customers.com
5. Request to resolve images.customers.com goes to a Speedera DNS server
6. NameServer software on the DNS server returns the Speedera WebCache IP address that is closest to the user, available and least loaded
7. If WebCache has cached the content, it is returned, otherwise process is as above Notice that high availability and high performance are available from the beginning. All DNS requests go through the Speedera network. Content that can be hosted is hosted through the Speedera network and delivered from a point closest to the user.

To determine latency from the client DNS to the customer's server IP addresses, latency information is used from the closest POP to the customer location. In some cases, the customer may be hosting at a co-location facility we already have latency probes running on. For large customers that have servers located at a location that is not close to one of our POPs, we could run a latency probe server at their site.

When used for traffic management, a setup that allows for failover can be used. If the customer only has one IP address for their www site, then the Speedera network can't provide any load balancing or high availability for it. When the customer has multiple IP addresses, the network can provide load balancing, high availability and closest point matching for their service.

Configuration

The configuration of the Speedera Network is maintained by centrally managed configuration files. These files are known as the "global configuration" files or "Speedera configuration" files. Every server in the network that needs configuration information has a copy of the appropriate current Speedera configuration file.

A configuration file contains all the configuration information for that portion of the network. Some of the data the configuration file contains is:
List of servers allowed to change the configuration
List of domains the network is responsible for
List of services the machines in each POP supports
List of probes that perform latency checks at each POP At any time, a new configuration file can be pushed to all machines that need it in a safe manner using the AdminTools software. No statistics, status or extended information is kept in the configuration file. It contains only the configuration information to keep its size at a minimum, and reduce the frequency of updates.

Monitoring

Real-time and historical information about the site is available through HTML by connecting to a server running NetView software.

Maintenance

The system is maintained using the AdminTools software. Some limited maintenance is available through HTML including the ability to purge content from all the caches in the network when original content is updated.

Software Requirements

Figure 9:
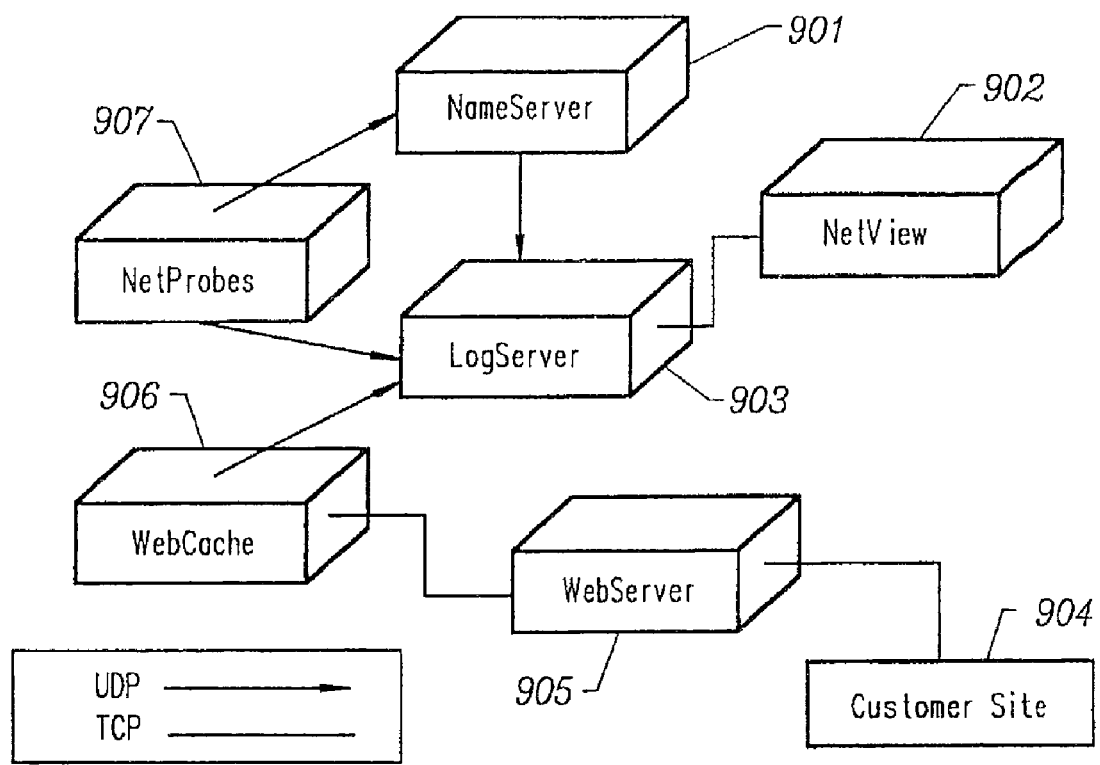
FIG. 9 is a block schematic diagram showing the interaction between software components of the invention according to an embodiment.

Referring to FIG. 9, the Speedera software consists of several distinct software components. The various components, NameServer server 901, NetProbes 907, LogServer server 903, NetView server 902, WebCache server 906, and WebServer server 905, interact with each other and the customer Web site 904, as described above.

Web Cache Description

A CacheServer is a POP server that serves requests that are cached in memory and on disk. WebCache is the Web caching server software on the CacheServer that responds to requests for Web content from clients (Web browsers). If the requested content does not exist in memory or on disk, it generates a request to an origin site to obtain the content. The caching servers write information about the content delivered to log files that are picked up and maintained by the LogServer software.

At a regular fixed interval, the server compresses and sends the logs of the content delivered to the log analysis servers. This information is used for billing as well as by customers for log analysis.

Netprobes Description

The NetProbes software component comprises server software executing on a computer system that performs probes to:
Determine server load and availability
Perform content checks to ensure servers are delivering correct content
Determine packet loss and latency on individual routes
Determine latency between points on the network and clients of the network
Perform ongoing monitoring of services Probes run constantly and send results to servers running NameServer software. They also log results to a log file that is picked up and maintained by the LogServer software. The NetProbes software performs 2 fundamental probes: (1) service probes; and (2) latency probes.

Service probes determine service availability and load (metrics) for each content delivery machine in the network. Service probes monitor things like HTTP total response time, FTP total response time, etc. Service probes run constantly, sending current metric and availability information to all DNS servers in the network. Probe intervals and configuration of service probes are set in the global configuration file.

Latency probes determine latency from their point to client DNS servers that send requests to Speedera DNS servers. The Speedera DNS servers drive the latency probes. When a DNS server determines that it needs latency information from a probe, it sends a request to the probe and the latency probe will probe the client DNS server and respond with the result.

The probe servers do not store the results of the probes, they simply send them to other servers over the network. Each piece of probe information has a timestamp of when the probe occurred so the receiving server can determine how stale the probe information is.

Figure 10:
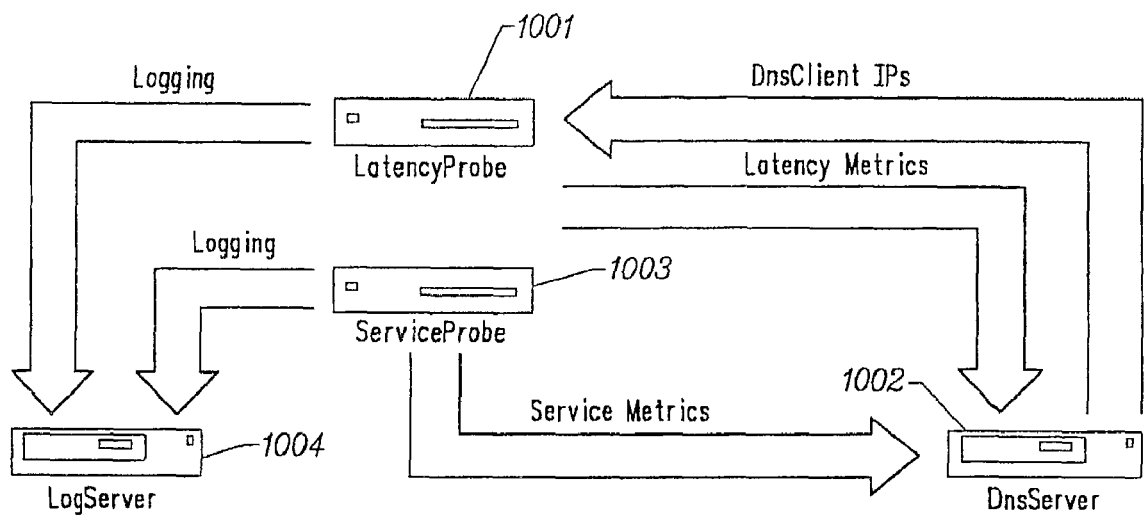
FIG. 10 is a block schematic diagram showing the exchange of data between Latency Probes, Service Probes and other servers within a network according to an embodiment.

The two different types of NetProbes, ServiceProbe 1003 and LatencyProbe 1001, are shown in FIG. 10. In the Speedera configuration file, each POP is assigned an IP address for a ServiceProbe 1003 and LatencyProbe 1001. They may be different but in most cases, a single machine will perform both service and latency probes.

ServiceProbes

ServiceProbe 1003 determines service metric information for servers in the Speedera Network. Each server in the network supports one or more services (e.g., a Web server machine provides an HTTP service; a FTP server provides an FTP service.) Each service supported by the Speedera Network has a metric test associated with it. The value of a service metric is dependent on the metric type. For example, an HTTP metric may have a value that represents the machine's response time to an HTTP request in milliseconds. The service test for HTTPS is similar, except that a secure session is established for the GET request. Secure sessions are not shared; rather a separate secure session with full key exchange is done for each test. For FTP, the test consists of establishing a connection to the FTP port on the server, and making sure that a ready response (220) is obtained from the FTP service. Different types of search engines will have different types of tests. Types of service probes include HTTP, HTTPS, FTP, Streaming Media (Real, Microsoft, etc.), Generic SNMP, etc.

At first glance, it may seem that the LOADP metric could be used as the HTTP or FTP metric. However, the LOADP metric doesn't accurately reflect how long a given HTTP request might take to execute on a server. It's best to produce a metric that is based on user-experience rather than trying to infer a metric from other means.

A ServiceProbe determines which metrics to calculate and what servers to probe by reading the Speedera configuration file. The configuration file contains a LatencyProbe and ServiceProbe entry for each POP.

When the ServiceProbe is configured, it will scan the entire list of POPs in its configuration and examine each ServiceProbe entry to determine if it is the ServiceProbe for that POP. If it is, it will read the list of servers and services contained in the POP and add them to the list of servers to monitor.

The ServiceProbe performs metric tests at various intervals and adds a line for each test to an internal table. The internal table may look like:

TABLE 1

Server Metric Table Example

| ServerIP | ServiceID | ErrorCode | Metric | TimeStamp |
|---|---|---|---|---|
| 1.2.3.4 | [1] HTTP | [0] NONE | 80 | 103019419 |
| 1.2.3.4 | [0] LOADP | [0] NONE | 340 | 103019421 |
| 1.2.3.4 | [2] FTP | [5] BAD_REQUEST | 65535 | 103019422 |
| 2.3.4.5 | [1] HTTP | [0] NONE | 70 | 103019424 |
| 2.3.4.5 | [0] LOADP | [0] NONE | 330 | 103019425 |

The ServiceID field in the table is the id that identifies the type of service. Each service in the Speedera network has an id specified in the services section of the Speedera configuration file. The ErrorCode field is an internal service-specific error code that can be used to help trace failures. An ErrorCode of 0 is used to signify no error. A metric value of 65535 also generally denotes a verification or timeout failure. The TimeStamp is the time the metric test was performed.

A test can fail either from a verification failure or a timeout. An example of a verification failure might be an HTTP test failing because a response does not contain an expected piece of text. A test can also time out if there is no response for some period of time. The timeout, in milliseconds, for each test is set in the Speedera configuration file.

SERVP Protocol

At various intervals, the ServiceProbe sends an update to all DnsServers in the Speedera Network using the Speedera SERVP protocol and writes the update to a log file. The update consists of the values of all tests since the last update. The Speedera configuration file contains two values that determine the interval for server metric updates "send interval" and "send size". The send size is the maximum size of an individual server metric update in bytes. As the probe runs, it accumulates metrics and keeps track of the size of the update packet related to the metrics. If the update packet reaches the size of the send size, the probe sends an update. If the send size is not reached, then the packet is sent when the send interval expires. Each update is formatted according to the SERVP protocol. The protocol is defined in the LOAD-BALANCING SERVICE application, previously incorporated by reference.

LOADP Protocol

To determine the load on a machine, a LOADP server is used. The serviceProbe sends a request, a LOADP server responds with a packet containing the various metrics of the server, e.g. Cpu, memory, snmp, network, scsi metrics. The service probe combines the server metrics to arrive at a load metric that is sent to the server.

The communication between the client and server is accomplished using the LOADP protocol. The LOADP protocol and the protocol of a response from a LOADP server is described in the LOAD-BALANCING SERVICE patent application, previously incorporated by reference. LOADP servers perform no logging of requests or responses.

The value returned by the service probe to Speedera DNS is:

$$load = (10 * loadAverage) + (swapSpaceUsed / 1000000)$$

A machine's loadAverage is typically in the range of 1.0-10.0. The swapSpaceUsed is in bytes and the division by 1M turns the right hand side into megabytes of swap space currently used. If the server can't calculate the load value for some reason, it will return a load of 1000.

Logging

When a SERVP server sends an update, the update is also written to a log file. Referring again to FIG. 10, the Speedera LogServer daemons 1004 perform the job of sending the log file to a central location for processing. The format of the log output is the same as the update, except:

there is no magic or numRows (no header)

the log file is in text file format there is a delimiter between columns (pipe symbol or similar)

The CPU/memory load of a machine is available using the LOADP service if the machine is running a LOADP daemon. LOADP is a protocol that returns a value describing a combination of CPU load and swap memory utilization.

In the Speedera configuration file, each DNS name has a set of services associated with it. The ftp<dot>speedera<dot>com DNS name may serve FTP content and therefore have an FTP service associated with it. A www<dot>speedera<dot>com domain name would have the HTTP service associated with it. A speedera.com domain name may have FTP and HTTP services associated with it.

Service metrics are used by DnsServers 1008 to determine the best server to return for a given DNS name. A DnsServer 1008 getting a request for ftp<dot>speedera<dot>com, for example, would know the request is for the FTP service and could compare the FTP service metrics of two servers to determine which is the best to return.

A DnsServer 1008 getting a request for speedera.com may not know which service will be utilized, so it may simply use the LOADP metric to determine which machine has the least loaded CPU and available memory.

LatencyProbes

A LatencyProbe 1001 figures out the latency from its location to other locations on the Internet. DnsServers 1008 use the latency from various latency points to determine which point is closest to a user.

When a user hits a Web site, such as www<dot>speedera<dot>com, his machine makes a request to its local DnsClient. This DnsClient, in turn, ends up making a request to a Speedera DnsServer 1008 if the server is authoritative for the www<dot>speedera<dot>com name.

When the Speedera DnsServer 1008 gets a request from a DnsClient, it needs to determine which servers are closest to the client as well as which servers have the best metrics to handle the request. To determine which servers are closest to the client, the DnsServer 1008 will consult tables that contain latency information from various LatencyProbes. Each server in the Speedera Network is contained in a POP and each POP has a LatencyProbe 1001 assigned to it.

LatencyProbes figure out the latency from the POP location to the client's location (normally local DNS server). Each POP in the Speedera Network has a LatencyProbe associated with it. Any number of POPs can share the same LatencyProbe. A LatencyProbe 1001 builds up a table of DnsClients to test over time, receiving the list of which DnsClient IP addresses to probe from the DnsServers in the network.

In the normal case, when a DnsServer gets a request from a DnsClient, it refers to the metric tables it has built up from each LatencyProbe, finds the DnsGroup entry for the DnsClient, and compares latency values to find the best IP address to return. If it can't find an entry in the tables for the DnsClient, it just returns a "best guess" IP address and sends the IP address of the new DnsClient to all NetProbes in the network at the next update interval.

At a regular interval, the DnsServers in the Speedera Network will send a list of the DnsGroups and DnsClient IP addresses that have recently made requests back to the NetProbe servers. This is used by the LatencyProbe to update the list with new DnsGroups and to update the use counter information for existing DnsGroups.

A machine determines if it is a LatencyProbe by looking at the LatencyProbe value for each POP in the Speedera configuration file. If it finds its IP address as a value for a LatencyProbe, it becomes an active LatencyProbe. The Latency Probe also parses the DNS Zone configuration in the Speedera Configuration file, to determine all the DNS servers to which latency metrics need to be sent.

Each LatencyProbe maintains a table of latency metrics from its location to a list of DnsGroups. A LatencyProbe will scan its table at regular intervals, looking for stale entries, and perform probes to update the stale values. The LatencyProbe maintains an internal table, with one row per Dns Group. The columns in the table are described in the LOAD-BALANCING SERVICE application, incorporated by reference above.

LatencyProbes perform latency tests by calculating the round trip time for sending a packet to a DnsClient in a given DnsGroup. A latency value from any DnsClient in the group will be considered to be the latency for the whole group.

The probe has a number of tests it can perform to determine the round trip time. LATNPD can be configured to try the different probe types in any order. These include:

PING

UDP Reverse Name lookup

UDP Packets to high ports numbers

Reverse name lookup is a standard DNS query that specifies a client IP address and asks for the client DNS name. When the client responds that gives the round trip time that is used as a latency value. If the reverse name lookup succeeds that latency value is FULL latency measurement. But if the lookup fails LATNPD tries Traceroute.

The UDP packets to high ports is much like traceroute which sends a raw UDP packet with large TTL value (64) to an unreachable port (33434) on the client DNS. This generates an ICMP unreachable port error message to the latency daemon. This response is used as a measure of latency. When the unreachable port error arrives, it suggests that the client is reached, this is considered to be FULL latency measurement.

However, sometimes the trace route message gets lost and no response comes back—so the probe times out. The probe (UDP) is repeated with a TTL value of, four, for example, addressed to the client Dns with the hope that at least four hops from the source can be reached. If this succeeds (LATNP gets an ICMP error message with code TIMEXCEED), repeat this probe process with a TTL value incremented by four, for example, (TTL now is eight) and keep doing this until we get no response. This will indicate the last reachable router and that is used as a proxy for the real client to measure the latency value. This is treated as PARTIAL latency data.

Once FULL latency data is achieved using a client, the probe is sent only to that client even if Speedera DNS sends new clients for the same group.

As mentioned above, LATNPD stores up to three IP addresses for each client DNS group. If a new client is added to a group that has only PARTIAL latency data available, it designates the new client as the active client and starts the probe process all over, starting with reverse name lookup, as the new client might give FULL latency data.

When a new client is added to a client DNS group, LATNPD tries to find a free dnsClient entry for the new client address. If it does not find a free entry it tries to replace a client that got only PARTIAL latency data and is not actively probed.

At an interval set by the configuration file, the LatencyProbe sends an update to all DnsServers in the Speedera Network with new DnsGroup latency information. Each DnsServer maintains a latency table associated with each LatencyProbe.

LATNP Protocol

The LatencyProbe uses the Speedera LATNP protocol to receive requests for latency metrics from the DNS servers and to update the DNS servers with the latency information for DNS groups.

The LATNP protocol implementation is supported using two messages. Both messages share a common header. The header is followed by a variable number of request elements for the Latency Request, and by a variable number of latency metric elements for the Latency Metric Message.

The Latency Request Message consists of the header followed by a sequence of IP addresses, representing DNS groups for which the metric is desired. The Latency Metric Message consists of the common header followed by the metric elements. Each metric element consists of the dns group, latency value, and the timestamp at which latency was measured. The format for each type of message is described in the LOAD-BALANCING SERVICE application, incorporated by reference above.

In both cases, from the DnsClient to the LatencyProbe and from the Latency Probe to the DnsClient, updates are sent at an interval defined in the Speedera configuration file. Each Latency Metric message contains any new latency measurements made during the interval between the previous message and the present message.

The Latency Probe logs the Statistics data periodically based on the logInterval set in the Speedera config file. The statistics are aggregated for all the Speedera DNS servers. The layout of the log file is as described in the LOAD-BALANCING SERVICE application, incorporated by reference above.

LogServer Description

A POP Server is any server in a POP that runs a log distributor daemon that sends log files to the log collector daemons on the log servers. A Log Server/Database Server is a server machine that collects log files from the POP servers via the log collector daemons. These log files are then processed and sent to a database server. The database server stores log files generated by log servers as tables. The Netview servers contact the database server to extract statistics like cache hits, billing etc.

A Netview server is a server that runs the user-interface to the Speedera Network via a Web server. The CGI scripts on this server generate requests to the database server on behalf of the clients that are connected to it.

For each unique customer hostname, the server must create a separate log file.

Log files will be rotated on a regular basis (after a certain timeout interval or a certain size threshold). Completed log files will be placed in a well known directory. They will be shipped automatically by the Log Server daemons.

Log files contains the fields Date, Time, FullURL, Request Status, Request Type, Number of Bytes, for each serviced request. These fields are delimited by a separator such as | or ^. This allows easy insertion in to a database on the receiving end.

Log files will be named according to a naming convention that uses the customer name, the machine name, the machine number, the location, network etc.

Figure 11:
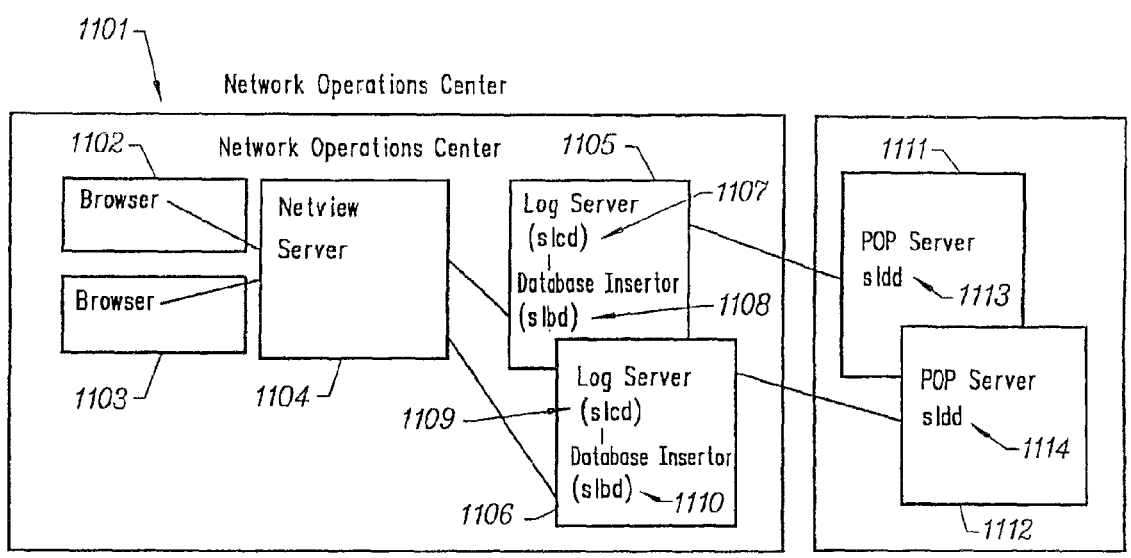
FIG. 11 is a block schematic diagram showing the processes and exchange of data between logging server components according to an embodiment.

With respect to FIG. 11, the logging subsystem consists of the following daemons that are used to distribute log files from the POP servers and collect them on the Log servers. In addition to the daemons, there are tools to dump log data into a database. The database can be queried by tools on the Netview servers for statistics and billing information etc.

The log distributor daemon (sldd) 1113, 1114, sends log files on a POP server 1111, 1112, to a log collector daemon (slcd) 1107, 1109, running on a Log Server 1105, 1106. Each log distributor daemon 1113, 1114, looks in a well known location for files it needs to send. Sldds 1113, 1114 are multi-threaded and can send multiple log files simultaneously.

The log collector daemon (slcd) 1107, 1109, collects log files from the log distributor daemons (sldd) 1113, 1114, and places them in directories specified by the date on which the files were received. This daemon is also multi-threaded to handle simultaneous connections from multiple log distributor daemons.

The database insertor daemon (sldb) 1108, 1110, collects the log files from the directories where the collector daemon (slcd) 1107, 1109, has placed them. It then opens a connection to the database and puts the contents of the log files into tables. The database insertor is multi-threaded and can load multiple log files simultaneously into the database.

A log distributor daemon 1113, 1114, running on a POP server 1111, 1112 does the following:

1. Check a well known directory (that is configurable) for files that need to be sent to the log collector daemons. The file name fully qualifies the type of file it is (one of either NetProbe, DNS or WebCache).

2. Create a new thread for each file that is ready.

3. Each thread determines the Log Server ip to send the file to by querying the DNS server. A query is made to log<dot>speedera<dot>com. If multiple ip's are returned, any random ip will be selected. In case, the connection to that ip fails, then all other ips will be tried in sequence till a connection is established or all ip's have been tried.

4. Compress the log file and send it over.

5. Exit the thread.

The log collector daemon 1107, 1109, running on the Log Server 1105, 1106, does the following:

1. Listen for connections from the log distributor daemons (sldd) 1113, 1114, and create a thread for each connection when it is established.

2. Send a ready message indicating available pre-allocated disk space for the file to the sldd 1113, 1114.

3. Receive the file, uncompress it and save it to disk in a well known location (that is configurable) under a numbered sub directory based on the current date.

4. Acknowledge receipt of the file, close the connection and exit the thread.

The database insertor daemon 1108, 1110, running on the Log Server 1105, 1106, does the following:

1. Looks up the latest directory in which the Log Collector daemon 1107, 1109, is placing the log files.

2. When a new log file is found, checks to see if the contents of the file needs to be added to the database. Some files like the syslog files need not be processed.

3. Creates a thread for the file. The thread establishes a connection to the database and inserts the contents of the log file into the database.

4. Exit the thread.

5. The database insertor 1108, 1110, can also be run in standalone mode. In this mode, sldb 1108, 1110, can be configured to look for files starting from a specified sub directory and insert them into the database.

The log daemons do not depend on the configuration file. All the information they need is hard coded or DNS based. This reduces the need to ship config files to all the servers in the network.

The following command line options are supported by the daemons.

d<donedir> sets the done directory for the distributor daemon r<recvdir> sets the receive directory for the collector daemon and database insertor daemon.

p<port num> sets the port num for the collector or distributor daemon i<ip> sets the default ip for sending log files, for the distributor daemon m<no. of threads> maximum number of threads for the daemon s run in standalone mode, not as a daemon D<debug level> sets the debug option with the level specified V prints the version information v prints the CV S version information h/? prints usage options Apart from the above the database insertor daemon (sldb) also supports the following options:

S<ddmmhhyy> date dir from which to start inserting files, default is current datedir b<subdir num> subdir number inside the startdir to start from, default is 0 e<end subdir> subdir at which to stop inserting files, default is to keep up with the collector daemon Message Formats The message format used to communicate between the log distributor daemon and the log collector daemon is described below. Each message consists of an eight byte fixed header plus a variable size payload:

| Version | Opcode | Info | Resvd |
|---|---|---|---|
| Payload Length | | | |
| Payload Data | | | |
| ... | | | |

Opcode (1 byte)
The currently defined opcodes are:

| Value | Name |
|---|---|
| 0 | SLU_INVALID |
| 1 | SLU_FILE_READY |
| 2 | SLU_RECV_READY |
| 3 | SLU_FILE_DATA |
| 4 | SLU_FILE_RECD |
| 5 | SLU_ERROR |

Info (1 byte)—Contains opcode specific information.
Version Number (1 byte)—The logging subsystem protocol version number
Payload Length (4 bytes)—The total length of the payload data in bytes.
Payload—Command specific payload data field.

SLU_INVALID—A place holder to detect zero-filled or malformed messages.

SLU_FILE_READY—The log distributor daemon sends this message to the log collector daemon after it finds a log file and connects. The expected response from the log collector daemon is an SLU_RECV_READY. If there is a problem an SLU_ERROR is returned.

SLU_RECV_READY—The log collector daemon returns this message when it is ready to receive data after a new connect.

SLU_FILE_DATA—This message is sent when the log distributor daemon is ready to send a file to the log collector daemon after the collector daemon returns the SLU_RECV_READY Message. The payload contains the compressed file data.

SLU_FILE_RECD—This message is sent when the log collector deamon has successfully recd a file.

SLU_ERROR—This message is returned on any non recoverable error. The info field in the message header contains qualifying information on the error condition. The connection is reset on any error condition.

In case the distributor daemon is not able to establish a connection to any of the Log Servers, the number of active threads is reduced to one. This thread keeps trying to connect to the Log Server after certain time intervals. If a connection is established, the number of threads for the distributor daemon is restored back to the maximum configured value.

Distributed DNS Network

An edge server generally refers to a server placed outside of the Internet, or at the edge of the Internet. Typically, edge servers cache content at various geographical areas in order to provide more efficient content delivery to clients. For example, a Canada edge server may be placed outside the Internet at a location that is geographically in Canada. This Canada edge server caches content that can be requested by users in Canada. Since the Canada edge server is typically geographically closer to users in Canada, fewer hops along the network will be needed to provide content from the edge server, and therefore content can be delivered much faster.

Techniques disclosed herein allow a Speedera DNS server as described in the UDN network above, or any other DNS server, to be implemented as a distributed DNS network of edge DNS cache servers. In a distributed DNS network, a central origin DNS server actually controls the zone, while edge DNS cache servers are configured to cache the DNS content of the origin DNS server. The edge DNS cache servers are published as the authoritative servers for customer domains instead of the origin DNS server.

Like web cache servers described above, when a request for DNS content, e.g., a DNS record, results in a cache miss, the edge DNS cache servers get the content from the origin server and cache it for use in response to future requests. Caching this content in edge DNS cache servers results in a domain name resolution service that gets faster as additional DNS content is cached.

Multiple edge DNS cache servers can be deployed at one or more locations. Since a virtually unlimited number of edge DNS cache servers can be deployed, the disclosed techniques provide unlimited scalability. The disclosed techniques protect against DoS attacks, as DNS requests are not made to the origin DNS server directly.

Distributed DNS Network Architecture Overview

FIG. 12 is a block diagram illustrating a system 1200 that incorporates a CDN network. An embodiment of the invention can be implemented in a CDN system as described in U.S. Pat. Nos. 6,405,252, 6,754,706, 6,484,143, 6,754,699, and 6,694,358, all owned by the Applicant and incorporated herein by reference. A plurality of Point of Presence sites (POPs) are distributed across the network 1204. Here two POPs 1210 and 1220 are shown. The network 1204 is typically the Internet, but can be any other large scale network such as an enterprise intranet.

Web browser 1202 refers to any functional component that is capable of requesting a Web page or any content that is identifiable by a URL. While only a single Web browser 1202 is depicted in FIG. 12 for ease of explanation, other embodiments may include any number and type of Web browsers.

Each POP 1210, 1220 contains a plurality of Web cache servers 1212A-1212D, 1222A-1222D. Operationally, a Web cache server caches cacheable CDN customer content such as images, video, documents, and static Web page content obtained from the customer's origin server 1205 and serves the cached content to client systems 1202. In addition, web cache servers may act as edge DNS servers that cache DNS content from the origin server.

In one embodiment, the origin server 1205 serves dynamic content to the client system. The Web cache server can also operate as a minor server, serving all of the content of an origin server 1205.

When a client makes a request for Web content through its Web browser 1202, the request is sent to the client's local DNS server 1203 for resolution of the host name. For example, Web browser 1202 may transmit a request to resolve the host name of "www<dot>customer<dot>com" to client DNS server 1203. The client DNS server 1203 sends a domain name resolution request to a customer DNS server. Since the customer DNS server is configured to delegate its domain to a POP DNS as the authoritative DNS, it tells the client DNS server 1203 to contact the authoritative POP DNS IP address for resolution of the request. The client DNS server 1203 then sends the request to the authoritative POP DNS server 1211.

The authoritative POP DNS server 1211 finds an appropriate Web cache server within the Web cache servers 1212A-1212D in the POP to serve the content to the client based on factors such as traffic load, latency, whether the server is more likely to have the content cached, etc. The authoritative POP DNS server 1211 returns the IP address of the Web cache server (e.g., 1212A) to the client DNS server 1203. The client DNS server 1203 sends the address to the client Web browser 1202.

Once the client Web browser 1202 receives the IP address of the Web cache server 1212A, it sends a request for Web content to the Web cache server 1212A. The Web cache server 1212A receives the request and searches its cache for the requested content. If the requested content is found in the Web cache server's cache, then the content is sent to the client Web browser 1202. If the content is not found in the Web cache server's cache, then the Web cache server 1212A can request the content from the origin server 1205.

A Web site operator may operate several POPs, each from a different geographical location, to minimize the distance over a network between a Web browser requesting content from the Web site and the Web server providing the Web site content to the requesting Web browser. While two POPs 1210, 1220 are shown in FIG. 12, system 1200 may include any number of POPs.

Each POP also contains one or more probes. A probe is any functional component that is capable of determining whether a Web cache server is operational and assessing the load on the Web cache server. Any of the probes discussed above can be used in system 1200. The probes are used by the POP DNS Server to load balance requests to the web cache servers.

In one embodiment, instead of a single physical POP DNS server, a distributed DNS network of edge DNS cache servers acts as a virtual DNS server for a POP. Edge DNS cache servers work in a similar fashion to web cache servers, and cache content from the origin server. In the case of edge DNS cache servers, the "content" is DNS information, such as DNS records. An optimal edge DNS cache server within the distributed DNS network is selected to provide the requested content, i.e., DNS records. A distributed DNS network is advantageous for load-balancing, traffic management and security purposes, as discussed herein.

Origin server 1205 is typically controlled by customers. Customers upload zone files, modify DNS configuration parameters and modify DNS records through origin server 1205. In one embodiment, origin server 1205 is managed by a third party service provider, such as Verisign, Speedera, etc. Although only a single origin server is shown in FIG. 12, one skilled in the art will appreciate that multiple origin servers could be deployed.

Origin server software may include software used for domain name resolution, such as BIND. BIND (Berkeley Internet Name Domain) is a well-known implementation of DNS protocols. A BIND DNS server is used on the vast majority of name servers on the Internet. The resolver library included in the BIND distribution provides the standard APIs for translation between domain names and Internet addresses.

A DNS Load Balancer component, module or application dynamically selects the best suitable edge DNS cache server to resolve a domain name resolution request received by the POP 1220. The selection criteria used by the DNS Load Balancer may include server availability, server load, network proximity between the client (requestor) and each edge DNS cache server, etc. The DNS Load Balancer may use any of the web cache load-balancing techniques described above. Since some domains require that the some DNS requests go to the same DNS server for persistency, the DNS Load Balancer may also use persistency requirements in the edge DNS cache server selection. Various criteria may be used together. For example, persistency requirements may indicate that a DNS request is to be sent to a particular edge DNS cache server; however that server is currently indicated as being down, or out of service. In this case, the DNS Load Balancer may send the request to a different edge DNS cache server.

The DNS Load Balancer may use probes to obtain information that is used to make the edge DNS cache server selection. For example, any of the probes or probe daemons described above may run on edge DNS cache server machines, and operate as described above for web cache servers.

A probe may periodically, or on demand, check status of various factors of an edge DNS cache server, such as status (i.e., up or down), network proximity between an edge DNS cache server and a client, and/or server load. There are many ways of performing probes. For example, network proximity could be checked by using a static table of network proximity, or a previous snapshot of network proximity. As another example, edge DNS cache server load could be checked by determining CPU usage and memory utilization. In addition, any of the specific techniques described in connection with the various probes used in a CDN described above (e.g., NetProbes, LatencyProbe, ServiceProbe, etc.) could also be used to implement a DNS probe in a distributed DNS network.

Administrator tools, such as NetView and AdminTools described above, allow customers to control the cache update, purge, or populate DNS content to edge DNS cache servers. A customer may use these tools to see reports, including statistics, of DNS requests, for example. Administrator tool applications are preferably HTTP-based so that it can be accessed by customers at any location.

One skilled in the art will appreciate that any number of edge DNS cache servers can be deployed at any number of POPs. Edge DNS cache servers can be configured to serve multiple domains as well as multiple customers.

Origin server 1205 communicates directly with web cache servers, including edge DNS cache servers. Edge DNS cache servers obtain DNS content from the origin server. If a service provider has control of the origin servers, a push mode may be used to automatically update all edge DNS cache servers whenever the origin server has a modification update. In this case, the edge DNS cache servers act like "slave" DNS servers. Alternatively, edge DNS cache servers can also periodically query the origin server for updates.

When a DNS request is directed to an edge DNS cache server, if the entry is not stored on the edge DNS cache server, the edge DNS cache server obtains the requested information from the origin server(s). Any results obtained this way are cached for use in future requests. In one embodiment the results are cached for the TTL time period specified in the records.

In a distributed DNS network, edge DNS cache servers directly serve all DNS requests from clients. In doing so, the origin server is hidden from clients. That is, clients never communicate directly with the origin server, and instead communicate with edge DNS cache servers.

DNS Record Update and Population

When customers register their DNS servers for domain services, edge DNS cache servers are registered as the actual authoritative DNS servers instead of the origin server(s). The registered edge DNS cache servers may be implemented as multiple virtual servers with virtual IP addresses, as discussed below. In this case, the virtual IP addresses are registered.

Origin servers include the original DNS servers controlled by customers. Customers have total control of DNS updates at the origin. In one embodiment, customers may outsource management of the origin servers to the providers of the distributed DNS network, or other third parties. DNS updates at the origin server, whether by a customer directly or by a third party, are distributed to the edge DNS cache servers in the distributed DNS network.

DNS modifications can be populated to edge DNS cache servers using various techniques. For example, if the edge DNS cache servers are set up as "slave" servers, as discussed above, any customer update will be pushed to all edge DNS cache servers immediately. As another example, customers can use the Administrator Tools to manually purge caches in the edge DNS cache servers, or to populate any configuration modifications to edge DNS cache servers, like any web cache server. As another example, edge DNS cache servers can periodically go to the origin server to update DNS content in its cache. Any combination of these techniques may be used.

In addition, whenever there is a cache miss at an edge DNS cache server, the cache server will go to the origin server to get the missing record. The edge DNS cache server may also obtain other DNS content at this time. In one embodiment, an edge DNS cache server could update DNS records for the entire domain. This is particularly useful in situations in which the number of DNS records is relatively small.

Virtual Dns Cache Server

In one embodiment, the edge cache DNS servers can be configured as one or more "virtual DNS cache servers." In this embodiment, a virtual DNS cache server is registered with the root DNS as the authoritative DNS server instead of the physical edge DNS cache servers.

Virtual DNS servers can be mapped to physical edge DNS cache servers in a number of ways. In one embodiment, many distributed edge DNS cache servers are assigned to a single IP address. In this embodiment, each edge DNS cache server in a virtual DNS cache server has an identical IP address.

IPv6 is a protocol by the Internet Engineering Task Force (IETF) that describes how to specify Internet packets. IPv6 includes an "anycast" feature that allows one to specify an anycast address (such as an IP address) that identifies multiple interfaces. With the appropriate unicast routing topology, packets addressed to an anycast address are delivered to a single interface, e.g. the nearest interface that is identified by the address. The nearest interface is defined as being the closest in terms of routing distance. Since DNS requests consist of a single UDP packet, the "anycast" feature of the IPv6 protocol works well for DNS. Internet routing intelligence can be used to route client DNS requests to the nearest edge DNS cache server in an embodiment that utilizes anycast.

In another embodiment, the DNS hierarchical structure can be used to map a virtual DNS server to physical edge DNS cache servers. In this embodiment, a domain name is delegated to multiple physical edge DNS cache servers. For example, CNAME records can be used to provide aliases for an IP address. Alternatively, delegation selection can be dynamically determined based on parameters from a DNS Load Balancer or a probe. In this embodiment, a client sends DNS requests to one of the delegated edge DNS cache servers.

In yet another embodiment, a separate load-balancer can be used to map a virtual IP address to multiple physical IP addresses. For example, BigIP available from F5 Networks, Inc., can be used as a load-balancer. In this embodiment, the load-balancer selects one of the best suitable edge DNS cache servers to serve a client DNS request.

In addition, any of these techniques, or other techniques know to those skilled in the art, can be used in combination to map a virtual DNC cache server to physical edge DNS cache servers.

Security Features of Distributed DNS Network

An important feature of the distributed DNS network disclosed herein is that the origin server is hidden from attack. As multiple edge DNS cache servers can be deployed, a large storm of DoS requests can be withstood.

In one embodiment, a distributed DNS network can filter out DoS attacks. Typically when an edge DNS cache server does not have a requested DNS content stored locally (i.e., a cache miss), it obtains the content from the origin server. However, in an embodiment that filters out DoS attacks, the distributed DNS network may be configured check the frequency of DNS requests. If the frequency exceeds a configurable threshold, and the requested entry is not in the cache, it is not treated as a typical cache miss. It is simply filtered out. The configurable threshold may be set to any value. For example, it may be set to a number that represents 20 times the normal number of DNS requests for a particular system.

In addition, if the same client makes many DNS requests to edge DNS cache servers again and again in rapid succession without regard to the DNS TTL, these requests can be filtered out as well.

In addition, a second threshold may be set for attackers using random source IP addresses and rapidly hit the edge DNS cache servers. This second threshold may be set, for example, to 50 times the normal DNS traffic for a particular system. Once it has been determined that attackers using random source IP addresses are rapidly hitting the edge DNS cache servers in excess of the second threshold, all requests from unknown sources can be filtered out, and only requests from known good sources will be served.

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A computer-implemented method, comprising:
   mapping a plurality of domain name service (DNS) cache servers to a virtual DNS server, the virtual DNS server being published as authoritative for a domain;
   caching DNS content from an origin DNS server at the plurality of DNS cache servers, the DNS content comprising one or more DNS records for use in responding to DNS requests for the domain;
   wherein DNS requests from clients for the domain are served by the plurality of DNS cache servers mapped to the authoritative virtual DNS server, instead of the origin DNS server, so as to hide the origin DNS server from such clients;
   and wherein the method is performed by one or more computing devices.

2. The method of claim 1, wherein the virtual DNS server is represented by an IP address, and mapping the plurality of DNS cache servers to the virtual DNS server comprises:
   assigning the IP address to a first DNS cache server; and assigning the IP address to a second DNS cache server.

3. The method of claim 2, further comprising:
   configuring the IP address as an anycast address.

4. The method of claim 1, wherein mapping the plurality of DNS cache servers to the virtual DNS server comprises delegating the domain name to the plurality of DNS cache servers.

5. The method of claim 1, wherein mapping the plurality of DNS cache servers to the virtual DNS server comprises configuring a load-balancer to select one of the plurality of DNS cache servers to serve a given DNS request directed to the virtual DNS server.

6. The method of claim 1, wherein the domain is a content provider domain, the content provider controlling the origin DNS server, and wherein the virtual DNS server and the plurality of DNS cache servers are associated with a content delivery network service provider to which the content provider has outsourced delivery of content.

7. The method of claim 1, further comprising the plurality of DNS cache servers protecting the origin DNS server from attack.

8. The method of claim 7, wherein the plurality of DNS cache servers selectively respond to DNS queries to protect the origin DNS server from attack.

9. The method of claim 1, wherein the plurality of DNS cache servers are a plurality of edge DNS cache servers.

10. A computer-readable non-transitory medium storing instructions which, when executed by one or more processors, cause the one or more processors to perform the following steps:
    mapping a plurality of domain name service (DNS) cache servers to a virtual DNS server, the virtual DNS server being published as authoritative for a domain;
    caching DNS content from an origin DNS server at the plurality of DNS cache servers, the DNS content comprising one or more DNS records for use in responding to DNS requests for the domain;
    wherein DNS requests from clients for the domain are served by the plurality of DNS cache servers mapped to the authoritative virtual DNS server, instead of the origin DNS server, so as to hide the origin DNS server from such clients.

11. The computer-readable non-transitory medium of claim 10, wherein the virtual DNS server is represented by an IP address, and mapping the plurality of DNS cache servers to the virtual DNS server comprises:
    assigning the IP address to a first DNS cache server; and, assigning the IP address to a second DNS cache server.

12. The computer-readable non-transitory medium of claim 11, wherein the steps further include:
    configuring the IP address as an anycast address.

13. The computer-readable non-transitory medium of claim 10, wherein mapping the plurality of DNS cache servers to the virtual DNS server comprises delegating the domain name to the plurality of DNS cache servers.

14. The computer-readable non-transitory medium of claim 10, wherein mapping the plurality of DNS cache servers to the virtual DNS server comprises configuring a load-balancer to select one of the plurality of DNS cache servers to serve a given DNS requests directed to the virtual DNS server.

15. The computer-readable non-transitory medium of claim 10, wherein the domain is a content provider domain, the content provider controlling the origin DNS server, and wherein the virtual DNS server and the plurality of DNS cache servers are associated with a content delivery network service provider to which the content provider has outsourced delivery of content.

16. The computer-readable non-transitory medium of claim 10, wherein the steps include the plurality of DNS cache servers protect the origin DNS server from attack.

17. The computer-readable non-transitory medium of claim 16, wherein the plurality of DNS cache servers selectively respond to DNS queries to protect the origin DNS server from attack.

18. The computer-readable non-transitory medium of claim 10, wherein the plurality of DNS cache servers are a plurality of edge DNS cache servers.

19. An apparatus, comprising:
    one or more processors and memory storing instructions that, when executed by the one or more processor, cause the apparatus to:
    map a plurality of domain name service (DNS) cache servers to a virtual DNS server, the virtual DNS server being published as authoritative for a domain;
    cache DNS content from an origin DNS server at the plurality of DNS cache servers, the DNS content comprising one or more DNS records for use in responding to DNS requests for the domain;
    wherein DNS requests from clients for the domain are served by the plurality of DNS cache servers mapped to the authoritative virtual DNS server, instead of the origin DNS server, so as to hide the origin DNS server from such clients.

20. The apparatus of claim 19, wherein the virtual DNS server is represented by an IP address, and mapping the plurality of DNS cache servers to the virtual DNS server comprises:
    assigning the IP address to a first DNS cache server; and, assigning the IP address to a second DNS cache server.

21. The apparatus of claim 20, wherein the executed instructions further cause the apparatus to:
    configure the IP address as an anycast address.

22. The apparatus of claim 19, wherein mapping the plurality of DNS cache servers to the virtual DNS server comprises delegating the domain name to the plurality of DNS cache servers.

23. The apparatus of claim 19, wherein mapping the plurality of DNS cache servers to the virtual DNS server comprises configuring a load-balancer to select one of the plurality of DNS cache servers to serve a given DNS request directed to the virtual DNS server.

24. The apparatus of claim 19, wherein the domain is a content provider domain, the content provider controlling the origin DNS server, and wherein the virtual DNS server and the plurality of DNS cache servers are associated with a content delivery network service provider to which the content provider has outsourced delivery of content.

25. The apparatus of claim 19, wherein upon execution the one or more instructions cause the plurality of cache DNS servers protect the origin DNS server from attack.

26. The apparatus of claim 25, wherein upon execution the one or more instructions cause the plurality of cache DNS servers selectively respond to DNS queries to protect the origin DNS server from attack.

27. The apparatus of claim 19, wherein the plurality of DNS cache servers are a plurality of edge DNS cache servers.

* * * * *